(12) United States Patent  
Jha et al.

(10) Patent No.: US 8,599,850 B2  
(45) Date of Patent: Dec. 3, 2013

(54) PROVISIONING SINGLE OR MULTISTAGE NETWORKS USING ETHERNET SERVICE INSTANCES (ESIS)

(75) Inventors: Pankaj K. Jha, Fremont, CA (US); Vivek Agarwal, San Jose, CA (US); Mitri Halabi, San Jose, CA (US); Ananda Rajagopal, San Jose, CA (US); Ram Dular Singh, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 487 days.

(21) Appl. No.: 12/684,022

(22) Filed: Jan. 7, 2010

(65) Prior Publication Data

US 2011/0069711 A1    Mar. 24, 2011

Related U.S. Application Data

(60) Provisional application No. 61/244,393, filed on Sep. 21, 2009.

(51) Int. Cl.  
*H04L 12/28* (2006.01)

(52) U.S. Cl.  
USPC .......................................... 370/390; 709/252

(58) Field of Classification Search  
USPC .......................................... 370/390; 709/252  
See application file for complete search history.

(56) References Cited

U.S. PATENT DOCUMENTS

| | | | |
|---|---|---|---|
| 3,866,175 A | 2/1975 | Seifert, Jr. et al. | |
| 4,325,119 A | 4/1982 | Grandmaison et al. | |
| 4,348,725 A | 9/1982 | Farrell et al. | |
| 4,628,480 A | 12/1986 | Floyd | |
| 4,667,323 A | 5/1987 | Engdahl et al. | |
| 4,679,190 A | 7/1987 | Dias et al. | |
| 4,683,564 A | 7/1987 | Young et al. | |
| 4,698,748 A | 10/1987 | Juzswik et al. | |
| 4,723,243 A | 2/1988 | Joshi et al. | |
| 4,754,482 A | 6/1988 | Weiss | |
| 4,791,629 A | 12/1988 | Burns et al. | |
| 4,794,629 A | 12/1988 | Pastyr et al. | |
| 4,807,280 A | 2/1989 | Posner et al. | |
| 4,876,681 A | 10/1989 | Hagiwara et al. | |

(Continued)

FOREIGN PATENT DOCUMENTS

| EP | 1380127 A2 | 1/2004 |
|---|---|---|
| JP | 2003/289359 A | 10/2003 |

(Continued)

OTHER PUBLICATIONS

Non-Final Office Action for U.S. Appl. No. 11/646,845, mailed on Oct. 14, 2011, 19 pages.

(Continued)

Primary Examiner — Wei Zhao  
(74) Attorney, Agent, or Firm — Kilpatrick Townsend & Stockton LLP

(57) ABSTRACT

Techniques for provisioning single or multistage networks using Ethernet Service Instances (ESIs). In one embodiment, an ESI is a logical entity or object that stores information that may be used to provision a network. An ESI may represent a logical entity that identifies a grouping of elements of a network or network device and associated attributes. Hierarchical relationships may be created between ESIs. The hierarchical relationships are used to perform packet-level processing including performing network packet encapsulations.

33 Claims, 12 Drawing Sheets

(56) References Cited

U.S. PATENT DOCUMENTS

| | | |
|---|---|---|
| 4,896,277 A | 1/1990 | Vercellotti et al. |
| 4,985,889 A | 1/1991 | Frankish et al. |
| 5,101,404 A | 3/1992 | Kunimoto et al. |
| 5,136,584 A | 8/1992 | Hedlund |
| 5,195,181 A | 3/1993 | Bryant et al. |
| 5,208,856 A | 5/1993 | Leduc et al. |
| 5,224,108 A | 6/1993 | McDysan et al. |
| 5,231,633 A | 7/1993 | Hluchyj et al. |
| 5,280,582 A | 1/1994 | Yang et al. |
| 5,282,196 A | 1/1994 | Clebowicz |
| 5,287,477 A | 2/1994 | Johnson et al. |
| 5,299,190 A | 3/1994 | LaMaire et al. |
| 5,299,195 A | 3/1994 | Shah |
| 5,301,192 A | 4/1994 | Henrion |
| 5,307,345 A | 4/1994 | Lozowick et al. |
| 5,323,386 A | 6/1994 | Wiher et al. |
| 5,365,512 A | 11/1994 | Combs et al. |
| 5,377,189 A | 12/1994 | Clark |
| 5,390,173 A | 2/1995 | Spinney et al. |
| 5,392,279 A | 2/1995 | Taniguchi |
| 5,406,643 A | 4/1995 | Burke et al. |
| 5,408,469 A | 4/1995 | Opher et al. |
| 5,430,442 A | 7/1995 | Kaiser et al. |
| 5,436,893 A | 7/1995 | Barnett |
| 5,461,615 A | 10/1995 | Henrion |
| 5,490,258 A | 2/1996 | Fenner |
| 5,506,840 A | 4/1996 | Pauwels et al. |
| 5,506,841 A | 4/1996 | Sandquist |
| 5,521,923 A | 5/1996 | Willmann et al. |
| 5,539,733 A | 7/1996 | Anderson et al. |
| 5,546,385 A | 8/1996 | Caspi et al. |
| 5,550,816 A | 8/1996 | Hardwick et al. |
| 5,563,948 A | 10/1996 | Diehl et al. |
| 5,566,170 A | 10/1996 | Bakke et al. |
| 5,598,410 A | 1/1997 | Stone |
| 5,600,795 A | 2/1997 | Du |
| 5,619,497 A | 4/1997 | Gallagher et al. |
| 5,640,504 A | 6/1997 | Johnson, Jr. |
| 5,646,878 A | 7/1997 | Samra |
| 5,649,089 A | 7/1997 | Kilner |
| 5,663,952 A | 9/1997 | Gentry, Jr. |
| 5,663,959 A | 9/1997 | Nakagawa |
| 5,666,353 A | 9/1997 | Klausmeier et al. |
| 5,721,819 A | 2/1998 | Galles et al. |
| 5,732,080 A | 3/1998 | Ferguson et al. |
| 5,734,826 A | 3/1998 | Olnowich et al. |
| 5,740,176 A | 4/1998 | Gupta et al. |
| 5,745,708 A | 4/1998 | Weppler et al. |
| 5,751,710 A | 5/1998 | Crowther et al. |
| 5,802,287 A | 9/1998 | Rostoker et al. |
| 5,815,146 A | 9/1998 | Youden et al. |
| 5,818,816 A | 10/1998 | Chikazawa et al. |
| 5,835,496 A | 11/1998 | Yeung et al. |
| 5,838,684 A | 11/1998 | Wicki et al. |
| 5,862,350 A | 1/1999 | Coulson |
| 5,864,555 A | 1/1999 | Mathur et al. |
| 5,867,675 A | 2/1999 | Lomelino et al. |
| 5,870,538 A | 2/1999 | Manning et al. |
| 5,872,769 A | 2/1999 | Caldara et al. |
| 5,872,783 A | 2/1999 | Chin |
| 5,875,200 A | 2/1999 | Glover et al. |
| 5,896,380 A | 4/1999 | Brown et al. |
| 5,907,566 A | 5/1999 | Benson et al. |
| 5,907,660 A | 5/1999 | Inoue et al. |
| 5,909,686 A | 6/1999 | Muller et al. |
| 5,915,094 A | 6/1999 | Kouloheris et al. |
| 5,920,566 A | 7/1999 | Hendel et al. |
| 5,920,886 A | 7/1999 | Feldmeier |
| 5,936,939 A | 8/1999 | Des Jardins et al. |
| 5,936,966 A | 8/1999 | Ogawa et al. |
| 5,956,347 A | 9/1999 | Slater |
| 5,999,528 A | 12/1999 | Chow et al. |
| 6,000,016 A | 12/1999 | Curtis et al. |
| 6,011,910 A | 1/2000 | Chau et al. |
| 6,016,310 A | 1/2000 | Muller et al. |
| 6,023,471 A | 2/2000 | Haddock et al. |
| 6,031,843 A | 2/2000 | Swanbery et al. |
| 6,035,414 A | 3/2000 | Okazawa et al. |
| 6,038,288 A | 3/2000 | Thomas et al. |
| 6,067,298 A | 5/2000 | Shinohara |
| 6,067,606 A | 5/2000 | Holscher et al. |
| 6,076,115 A | 6/2000 | Sambamurthy et al. |
| 6,081,522 A | 6/2000 | Hendel et al. |
| 6,088,356 A | 7/2000 | Hendel et al. |
| 6,094,434 A | 7/2000 | Kotzur et al. |
| 6,101,552 A | 8/2000 | Chiang et al. |
| 6,104,696 A | 8/2000 | Kadambi et al. |
| 6,104,700 A | 8/2000 | Haddock et al. |
| 6,108,306 A | 8/2000 | Kalkunte et al. |
| 6,118,787 A | 9/2000 | Kalkunte et al. |
| 6,125,417 A | 9/2000 | Bailis et al. |
| 6,128,666 A | 10/2000 | Muller et al. |
| 6,144,668 A | 11/2000 | Bass et al. |
| 6,147,996 A | 11/2000 | Laor et al. |
| 6,151,301 A | 11/2000 | Holden |
| 6,151,497 A | 11/2000 | Yee et al. |
| 6,154,446 A | 11/2000 | Kadambi et al. |
| 6,157,643 A | 12/2000 | Ma |
| 6,160,809 A | 12/2000 | Adiletta et al. |
| 6,160,812 A | 12/2000 | Bauman et al. |
| 6,172,990 B1 | 1/2001 | Deb et al. |
| 6,178,520 B1 | 1/2001 | DeKoning et al. |
| 6,181,699 B1 | 1/2001 | Crinion et al. |
| 6,185,208 B1 | 2/2001 | Liao |
| 6,185,222 B1 | 2/2001 | Hughes |
| 6,194,666 B1 | 2/2001 | Hayashida et al. |
| 6,195,335 B1 | 2/2001 | Calvignac et al. |
| 6,201,492 B1 | 3/2001 | Amar et al. |
| 6,222,845 B1 | 4/2001 | Shue et al. |
| 6,243,667 B1 | 6/2001 | Kerr et al. |
| 6,249,528 B1 | 6/2001 | Kothary |
| 6,263,374 B1 | 7/2001 | Olnowich et al. |
| 6,272,144 B1 | 8/2001 | Berenbaum et al. |
| 6,304,903 B1 | 10/2001 | Ward |
| 6,320,859 B1 | 11/2001 | Momirov |
| 6,333,929 B1 | 12/2001 | Drottar et al. |
| 6,335,932 B2 | 1/2002 | Kadambi et al. |
| 6,335,935 B2 | 1/2002 | Kadambi et al. |
| 6,343,072 B1 | 1/2002 | Bechtolsheim et al. |
| 6,351,143 B1 | 2/2002 | Guccione et al. |
| 6,356,550 B1 | 3/2002 | Williams |
| 6,356,942 B1 | 3/2002 | Bengtsson et al. |
| 6,359,879 B1 | 3/2002 | Carvey et al. |
| 6,363,077 B1 | 3/2002 | Wong et al. |
| 6,366,557 B1 | 4/2002 | Hunter |
| 6,369,855 B1 | 4/2002 | Chauvel et al. |
| 6,370,579 B1 | 4/2002 | Partridge |
| 6,421,352 B1 | 7/2002 | Manaka et al. |
| 6,424,658 B1 | 7/2002 | Mathur |
| 6,424,659 B2 | 7/2002 | Viswanadham et al. |
| 6,427,185 B1 | 7/2002 | Ryals et al. |
| 6,430,190 B1 | 8/2002 | Essbaum et al. |
| 6,442,067 B1 | 8/2002 | Chawla et al. |
| 6,457,175 B1 | 9/2002 | Lerche |
| 6,459,705 B1 | 10/2002 | Cheng |
| 6,460,088 B1 | 10/2002 | Merchant |
| 6,463,063 B1 | 10/2002 | Bianchini, Jr. et al. |
| 6,466,608 B1 | 10/2002 | Hong et al. |
| 6,470,436 B1 | 10/2002 | Croft et al. |
| 6,473,428 B1 | 10/2002 | Nichols et al. |
| 6,473,433 B1 | 10/2002 | Bianchini, Jr. et al. |
| 6,477,174 B1 | 11/2002 | Dooley et al. |
| 6,480,477 B1 | 11/2002 | Treadaway et al. |
| 6,490,280 B1 | 12/2002 | Leung |
| 6,493,347 B2 | 12/2002 | Sindhu et al. |
| 6,496,502 B1 | 12/2002 | Fite et al. |
| 6,505,281 B1 | 1/2003 | Sherry |
| 6,510,138 B1 | 1/2003 | Pannell |
| 6,522,656 B1 | 2/2003 | Gridley |
| 6,532,229 B1 | 3/2003 | Johnson et al. |
| 6,532,234 B1 | 3/2003 | Yoshikawa et al. |
| 6,535,504 B1 | 3/2003 | Johnson et al. |
| 6,549,519 B1 | 4/2003 | Michels et al. |
| 6,553,370 B1 | 4/2003 | Andreev et al. |

(56) References Cited

U.S. PATENT DOCUMENTS

| | | |
|---|---|---|
| 6,556,208 B1 | 4/2003 | Congdon et al. |
| 6,567,404 B1 | 5/2003 | Wilford |
| 6,570,884 B1 | 5/2003 | Connery et al. |
| 6,577,631 B1 | 6/2003 | Keenan et al. |
| 6,587,432 B1 | 7/2003 | Putzolu et al. |
| 6,591,302 B2 | 7/2003 | Boucher et al. |
| 6,601,186 B1 | 7/2003 | Fox et al. |
| 6,606,300 B1 | 8/2003 | Blanc et al. |
| 6,628,650 B1 | 9/2003 | Saite et al. |
| 6,633,580 B1 | 10/2003 | Torudbakken et al. |
| 6,636,483 B1 | 10/2003 | Pannell |
| 6,643,269 B1 | 11/2003 | Fan et al. |
| 6,654,342 B1 | 11/2003 | Dittia et al. |
| 6,654,346 B1 | 11/2003 | Mahalingaiah et al. |
| 6,654,370 B1 | 11/2003 | Quirke et al. |
| 6,654,373 B1 | 11/2003 | Maher, III et al. |
| 6,658,002 B1 | 12/2003 | Ross et al. |
| 6,661,791 B1 | 12/2003 | Brown |
| 6,671,275 B1 | 12/2003 | Wong et al. |
| 6,678,248 B1 | 1/2004 | Haddock et al. |
| 6,681,332 B1 | 1/2004 | Byrne et al. |
| 6,683,872 B1 | 1/2004 | Saito |
| 6,687,217 B1 | 2/2004 | Chow et al. |
| 6,687,247 B1 | 2/2004 | Wilford et al. |
| 6,690,757 B1 | 2/2004 | Bunton et al. |
| 6,691,202 B2 | 2/2004 | Vasquez et al. |
| 6,696,917 B1 | 2/2004 | Heitner et al. |
| 6,697,359 B1 | 2/2004 | George |
| 6,697,368 B2 | 2/2004 | Chang et al. |
| 6,700,894 B1 | 3/2004 | Shung |
| 6,708,000 B1 | 3/2004 | Nishi et al. |
| 6,721,229 B1 | 4/2004 | Cole |
| 6,721,268 B1 | 4/2004 | Ohira et al. |
| 6,721,313 B1 | 4/2004 | Van Duyne |
| 6,721,338 B1 | 4/2004 | Sato |
| 6,731,875 B1 | 5/2004 | Kartalopoulos |
| 6,735,218 B2 | 5/2004 | Chang et al. |
| 6,745,277 B1 | 6/2004 | Lee et al. |
| 6,747,971 B1 | 6/2004 | Hughes et al. |
| 6,751,224 B1 | 6/2004 | Parruck et al. |
| 6,754,881 B2 | 6/2004 | Kuhlmann et al. |
| 6,765,866 B1 | 7/2004 | Wyatt |
| 6,775,706 B1 | 8/2004 | Fukumoto et al. |
| 6,778,546 B1 | 8/2004 | Epps et al. |
| 6,781,990 B1 | 8/2004 | Puri et al. |
| 6,785,290 B1 | 8/2004 | Fujisawa et al. |
| 6,788,697 B1 | 9/2004 | Aweya et al. |
| 6,792,484 B1 | 9/2004 | Hook |
| 6,792,502 B1 | 9/2004 | Pandya et al. |
| 6,798,740 B1 | 9/2004 | Senevirathne et al. |
| 6,804,220 B2 | 10/2004 | Odenwalder et al. |
| 6,804,731 B1 | 10/2004 | Chang et al. |
| 6,804,815 B1 | 10/2004 | Kerr et al. |
| 6,807,179 B1 | 10/2004 | Kanuri et al. |
| 6,807,363 B1 | 10/2004 | Abiko et al. |
| 6,810,038 B1 | 10/2004 | Isoyama et al. |
| 6,810,046 B2 | 10/2004 | Abbas et al. |
| 6,813,243 B1 | 11/2004 | Epps et al. |
| 6,813,266 B1 | 11/2004 | Chiang et al. |
| 6,816,467 B1 | 11/2004 | Muller et al. |
| 6,831,923 B1 | 12/2004 | Laor et al. |
| 6,831,932 B1 | 12/2004 | Boyle et al. |
| 6,836,808 B2 | 12/2004 | Bunce et al. |
| 6,839,346 B1 | 1/2005 | Kametani |
| 6,842,422 B1 | 1/2005 | Bianchini |
| 6,842,903 B1 * | 1/2005 | Weschler ................. 719/328 |
| 6,854,117 B1 | 2/2005 | Roberts |
| 6,856,600 B1 | 2/2005 | Russell et al. |
| 6,859,438 B2 | 2/2005 | Haddock et al. |
| 6,865,153 B1 | 3/2005 | Hill et al. |
| 6,873,630 B1 | 3/2005 | Muller et al. |
| 6,901,072 B1 | 5/2005 | Wong |
| 6,906,936 B1 | 6/2005 | James et al. |
| 6,912,637 B1 | 6/2005 | Herbst |
| 6,920,154 B1 | 7/2005 | Achler |
| 6,925,516 B2 | 8/2005 | Struhsaker et al. |
| 6,934,305 B1 | 8/2005 | Duschatko et al. |
| 6,937,606 B2 | 8/2005 | Basso et al. |
| 6,946,948 B2 | 9/2005 | McCormack et al. |
| 6,952,419 B1 | 10/2005 | Cassiday et al. |
| 6,957,258 B2 | 10/2005 | Maher, III et al. |
| 6,959,007 B1 | 10/2005 | Vogel et al. |
| 6,961,347 B1 | 11/2005 | Bunton et al. |
| 6,965,615 B1 | 11/2005 | Kerr et al. |
| 6,973,092 B1 | 12/2005 | Zhou et al. |
| 6,975,599 B1 | 12/2005 | Johnson et al. |
| 6,978,309 B1 | 12/2005 | Dorbolo |
| 6,980,552 B1 | 12/2005 | Belz et al. |
| 6,982,974 B1 | 1/2006 | Saleh et al. |
| 6,990,102 B1 | 1/2006 | Kaniz et al. |
| 6,993,032 B1 | 1/2006 | Dammann et al. |
| 6,996,663 B1 | 2/2006 | Marsteiner |
| 7,005,812 B2 | 2/2006 | Mitchell |
| 7,009,968 B2 | 3/2006 | Ambe et al. |
| 7,012,919 B1 | 3/2006 | So et al. |
| 7,050,430 B2 | 5/2006 | Kalkunte et al. |
| 7,050,505 B2 | 5/2006 | Kaku |
| 7,065,673 B2 | 6/2006 | Subramaniam et al. |
| 7,082,133 B1 | 7/2006 | Lor et al. |
| 7,095,753 B1 | 8/2006 | Milliken et al. |
| 7,103,041 B1 | 9/2006 | Speiser et al. |
| 7,106,692 B1 | 9/2006 | Schulz |
| 7,120,744 B2 | 10/2006 | Klein |
| 7,126,948 B2 | 10/2006 | Gooch et al. |
| 7,126,956 B2 | 10/2006 | Scholten |
| 7,151,797 B2 | 12/2006 | Limberg |
| 7,161,948 B2 | 1/2007 | Sampath et al. |
| 7,167,471 B2 | 1/2007 | Calvignac et al. |
| 7,176,911 B1 | 2/2007 | Kidono et al. |
| 7,185,141 B1 | 2/2007 | James et al. |
| 7,185,266 B2 | 2/2007 | Blightman et al. |
| 7,187,687 B1 | 3/2007 | Davis et al. |
| 7,188,237 B2 | 3/2007 | Zhou et al. |
| 7,190,696 B1 | 3/2007 | Manur et al. |
| 7,191,277 B2 | 3/2007 | Broyles |
| 7,191,468 B2 | 3/2007 | Hanner |
| 7,194,652 B2 | 3/2007 | Zhou et al. |
| 7,203,194 B2 | 4/2007 | Chang et al. |
| 7,206,283 B2 | 4/2007 | Chang et al. |
| 7,212,536 B2 | 5/2007 | Mackiewich et al. |
| 7,218,637 B1 | 5/2007 | Best et al. |
| 7,219,293 B2 | 5/2007 | Tsai et al. |
| 7,228,509 B1 | 6/2007 | Dada et al. |
| 7,236,490 B2 | 6/2007 | Chang et al. |
| 7,237,058 B2 | 6/2007 | Srinivasan |
| 7,266,117 B1 | 9/2007 | Davis |
| 7,272,611 B1 | 9/2007 | Cuppett et al. |
| 7,272,613 B2 | 9/2007 | Sim et al. |
| 7,277,425 B1 | 10/2007 | Sikdar |
| 7,283,547 B1 | 10/2007 | Hook et al. |
| 7,284,236 B2 | 10/2007 | Zhou et al. |
| 7,286,534 B2 | 10/2007 | Kloth |
| 7,298,752 B2 | 11/2007 | Moriwaki et al. |
| 7,324,509 B2 | 1/2008 | Ni |
| 7,355,970 B2 | 4/2008 | Lor |
| 7,356,030 B2 | 4/2008 | Chang et al. |
| 7,391,769 B2 | 6/2008 | Rajkumar et al. |
| 7,414,979 B1 | 8/2008 | Jarvis |
| 7,468,975 B1 | 12/2008 | Davis |
| 7,512,127 B2 | 3/2009 | Chang et al. |
| 7,543,077 B1 | 6/2009 | Milliken et al. |
| 7,558,193 B2 | 7/2009 | Bradbury et al. |
| 7,561,590 B1 | 7/2009 | Walsh |
| 7,590,760 B1 | 9/2009 | Banks |
| 7,596,139 B2 | 9/2009 | Patel et al. |
| 7,606,968 B2 | 10/2009 | Branscome et al. |
| 7,609,617 B2 | 10/2009 | Appanna et al. |
| 7,613,991 B1 | 11/2009 | Bain |
| 7,624,283 B2 | 11/2009 | Bade et al. |
| 7,636,369 B2 | 12/2009 | Wong |
| 7,649,885 B1 | 1/2010 | Davis |
| 7,657,703 B1 | 2/2010 | Singh |
| 7,721,297 B2 | 5/2010 | Ward |
| 7,738,450 B1 | 6/2010 | Davis |

(56) References Cited

U.S. PATENT DOCUMENTS

| | | |
|---|---|---|
| 7,813,367 B2 | 10/2010 | Wong |
| 7,817,659 B2 | 10/2010 | Wong |
| 7,821,972 B1 * | 10/2010 | Finn et al. ............... 370/256 |
| 7,830,884 B2 | 11/2010 | Davis |
| 7,903,654 B2 | 3/2011 | Bansal |
| 7,933,947 B2 | 4/2011 | Fleischer et al. |
| 7,948,872 B2 | 5/2011 | Patel et al. |
| 7,953,922 B2 | 5/2011 | Singh |
| 7,953,923 B2 | 5/2011 | Singh |
| 7,978,614 B2 | 7/2011 | Wong et al. |
| 7,978,702 B2 | 7/2011 | Chang et al. |
| 7,995,580 B2 | 8/2011 | Patel et al. |
| 8,014,278 B1 | 9/2011 | Subramanian et al. |
| 8,037,399 B2 | 10/2011 | Wong et al. |
| 8,090,901 B2 | 1/2012 | Lin et al. |
| 8,140,044 B2 | 3/2012 | Villain et al. |
| 8,149,839 B1 | 4/2012 | Hsu et al. |
| 8,155,011 B2 | 4/2012 | Wong et al. |
| 8,201,180 B2 * | 6/2012 | Briscoe et al. ............... 718/104 |
| 8,238,255 B2 | 8/2012 | Suresh et al. |
| 8,271,859 B2 | 9/2012 | Wong et al. |
| 8,395,996 B2 | 3/2013 | Wong et al. |
| 2001/0001879 A1 | 5/2001 | Kubik et al. |
| 2001/0007560 A1 | 7/2001 | Masuda et al. |
| 2001/0026551 A1 | 10/2001 | Horlin |
| 2001/0048785 A1 | 12/2001 | Steinberg |
| 2001/0053150 A1 | 12/2001 | Clear et al. |
| 2002/0001307 A1 | 1/2002 | Nguyen et al. |
| 2002/0040417 A1 | 4/2002 | Winograd et al. |
| 2002/0048280 A1 | 4/2002 | Lee et al. |
| 2002/0054594 A1 | 5/2002 | Hoof et al. |
| 2002/0054595 A1 | 5/2002 | Ambe et al. |
| 2002/0069294 A1 | 6/2002 | Herkersdorf et al. |
| 2002/0073073 A1 | 6/2002 | Cheng |
| 2002/0085499 A1 | 7/2002 | Toyoyama et al. |
| 2002/0087788 A1 | 7/2002 | Morris |
| 2002/0089937 A1 | 7/2002 | Venkatachary et al. |
| 2002/0091844 A1 | 7/2002 | Craft et al. |
| 2002/0091884 A1 | 7/2002 | Chang et al. |
| 2002/0126672 A1 | 9/2002 | Chow et al. |
| 2002/0131437 A1 | 9/2002 | Tagore-Brage |
| 2002/0141403 A1 | 10/2002 | Akahane et al. |
| 2002/0146013 A1 | 10/2002 | Karlsson et al. |
| 2002/0161967 A1 | 10/2002 | Kirihata et al. |
| 2002/0169786 A1 | 11/2002 | Richek |
| 2002/0181476 A1 | 12/2002 | Badamo et al. |
| 2002/0191605 A1 | 12/2002 | Van Lunteren et al. |
| 2003/0009466 A1 | 1/2003 | Ta et al. |
| 2003/0012198 A1 | 1/2003 | Kaganoi |
| 2003/0043800 A1 | 3/2003 | Sonksen et al. |
| 2003/0043848 A1 | 3/2003 | Sonksen |
| 2003/0061459 A1 | 3/2003 | Aboulenein et al. |
| 2003/0074657 A1 | 4/2003 | Bramley, Jr. |
| 2003/0081608 A1 | 5/2003 | Barri et al. |
| 2003/0095548 A1 | 5/2003 | Yamano |
| 2003/0103499 A1 | 6/2003 | Davis et al. |
| 2003/0103500 A1 | 6/2003 | Menon et al. |
| 2003/0108052 A1 | 6/2003 | Inoue et al. |
| 2003/0110180 A1 | 6/2003 | Calvignac et al. |
| 2003/0115403 A1 | 6/2003 | Bouchard et al. |
| 2003/0120861 A1 | 6/2003 | Calle et al. |
| 2003/0128668 A1 | 7/2003 | Yavatkar et al. |
| 2003/0137978 A1 | 7/2003 | Kanetake |
| 2003/0152084 A1 | 8/2003 | Lee et al. |
| 2003/0152096 A1 | 8/2003 | Chapman |
| 2003/0156586 A1 | 8/2003 | Lee et al. |
| 2003/0159086 A1 | 8/2003 | Arndt |
| 2003/0165160 A1 | 9/2003 | Minami et al. |
| 2003/0169470 A1 | 9/2003 | Alagar et al. |
| 2003/0177221 A1 | 9/2003 | Ould-Brahim et al. |
| 2003/0198182 A1 | 10/2003 | Pegrum et al. |
| 2003/0200343 A1 | 10/2003 | Greenblat et al. |
| 2003/0214956 A1 | 11/2003 | Navada et al. |
| 2003/0223424 A1 | 12/2003 | Anderson et al. |
| 2003/0223466 A1 | 12/2003 | Noronha, Jr. et al. |
| 2003/0227943 A1 | 12/2003 | Hallman et al. |
| 2004/0022263 A1 | 2/2004 | Zhao et al. |
| 2004/0028060 A1 | 2/2004 | Kang |
| 2004/0054867 A1 | 3/2004 | Stravers et al. |
| 2004/0062130 A1 | 4/2004 | Chiang |
| 2004/0062245 A1 | 4/2004 | Sharp et al. |
| 2004/0062246 A1 | 4/2004 | Boucher et al. |
| 2004/0083404 A1 | 4/2004 | Subramaniam et al. |
| 2004/0088469 A1 | 5/2004 | Levy |
| 2004/0128434 A1 | 7/2004 | Khanna et al. |
| 2004/0141504 A1 | 7/2004 | Blanc |
| 2004/0190547 A1 | 9/2004 | Gordy et al. |
| 2004/0205393 A1 | 10/2004 | Kitamorn et al. |
| 2004/0208177 A1 | 10/2004 | Ogawa |
| 2004/0208181 A1 | 10/2004 | Clayton et al. |
| 2004/0223502 A1 | 11/2004 | Wybenga et al. |
| 2004/0235480 A1 | 11/2004 | Rezaaifar et al. |
| 2004/0264380 A1 | 12/2004 | Kalkunte et al. |
| 2005/0010630 A1 | 1/2005 | Doering et al. |
| 2005/0010849 A1 | 1/2005 | Ryle et al. |
| 2005/0041684 A1 | 2/2005 | Reynolds et al. |
| 2005/0097432 A1 | 5/2005 | Obuchi et al. |
| 2005/0120122 A1 | 6/2005 | Farnham |
| 2005/0132132 A1 | 6/2005 | Rosenbluth et al. |
| 2005/0132179 A1 | 6/2005 | Glaum et al. |
| 2005/0138276 A1 | 6/2005 | Navada et al. |
| 2005/0144369 A1 | 6/2005 | Jaspers |
| 2005/0152324 A1 | 7/2005 | Benveniste |
| 2005/0152335 A1 | 7/2005 | Lodha et al. |
| 2005/0169317 A1 | 8/2005 | Pruecklmayer |
| 2005/0185577 A1 | 8/2005 | Sakamoto et al. |
| 2005/0185652 A1 | 8/2005 | Iwamoto |
| 2005/0193316 A1 | 9/2005 | Chen |
| 2005/0201387 A1 | 9/2005 | Willis |
| 2005/0226236 A1 | 10/2005 | Klink |
| 2005/0246508 A1 | 11/2005 | Shaw |
| 2005/0249124 A1 | 11/2005 | Elie-Dit-Cosaque et al. |
| 2006/0031610 A1 | 2/2006 | Liav et al. |
| 2006/0034452 A1 | 2/2006 | Tonomura |
| 2006/0050690 A1 | 3/2006 | Epps et al. |
| 2006/0077891 A1 | 4/2006 | Smith et al. |
| 2006/0092829 A1 | 5/2006 | Brolin et al. |
| 2006/0092929 A1 | 5/2006 | Chun |
| 2006/0114876 A1 | 6/2006 | Kalkunte |
| 2006/0146374 A1 | 7/2006 | Ng et al. |
| 2006/0165089 A1 | 7/2006 | Klink |
| 2006/0209685 A1 | 9/2006 | Rahman et al. |
| 2006/0221841 A1 | 10/2006 | Lee et al. |
| 2006/0268680 A1 | 11/2006 | Roberts et al. |
| 2006/0274749 A1 | 12/2006 | Beier |
| 2007/0038798 A1 | 2/2007 | Bouchard et al. |
| 2007/0088974 A1 | 4/2007 | Chandwani et al. |
| 2007/0127464 A1 | 6/2007 | Jain et al. |
| 2007/0179909 A1 | 8/2007 | Channasagara |
| 2007/0208876 A1 | 9/2007 | Davis |
| 2007/0258475 A1 | 11/2007 | Chinn et al. |
| 2007/0288690 A1 | 12/2007 | Wang et al. |
| 2008/0025309 A1 | 1/2008 | Swallow |
| 2008/0031263 A1 | 2/2008 | Ervin et al. |
| 2008/0037544 A1 | 2/2008 | Yano et al. |
| 2008/0069125 A1 | 3/2008 | Reed et al. |
| 2008/0092020 A1 | 4/2008 | Hasenplaugh et al. |
| 2008/0095169 A1 | 4/2008 | Chandra et al. |
| 2008/0117075 A1 | 5/2008 | Seddigh et al. |
| 2008/0126652 A1 | 5/2008 | Vembu et al. |
| 2008/0159309 A1 * | 7/2008 | Sultan et al. ............... 370/401 |
| 2008/0181103 A1 | 7/2008 | Davies |
| 2008/0205407 A1 | 8/2008 | Chang et al. |
| 2008/0307288 A1 | 12/2008 | Ziesler et al. |
| 2009/0175178 A1 | 7/2009 | Yoon et al. |
| 2009/0207838 A1 | 8/2009 | Milliken et al. |
| 2009/0279423 A1 | 11/2009 | Suresh et al. |
| 2009/0279440 A1 | 11/2009 | Wong et al. |
| 2009/0279441 A1 | 11/2009 | Wong et al. |
| 2009/0279541 A1 | 11/2009 | Wong et al. |
| 2009/0279542 A1 | 11/2009 | Wong et al. |
| 2009/0279546 A1 | 11/2009 | Davis |
| 2009/0279549 A1 | 11/2009 | Ramanathan et al. |
| 2009/0279558 A1 | 11/2009 | Davis et al. |

(56) References Cited

U.S. PATENT DOCUMENTS

| | | |
|---|---|---|
| 2009/0279561 A1 | 11/2009 | Chang et al. |
| 2009/0282148 A1 | 11/2009 | Wong et al. |
| 2009/0282322 A1 | 11/2009 | Wong et al. |
| 2009/0287952 A1 | 11/2009 | Patel et al. |
| 2009/0290499 A1 | 11/2009 | Patel et al. |
| 2010/0034215 A1 | 2/2010 | Patel et al. |
| 2010/0046521 A1 | 2/2010 | Wong |
| 2010/0061393 A1 | 3/2010 | Wong |
| 2010/0100671 A1 | 4/2010 | Singh |
| 2010/0135313 A1 | 6/2010 | Davis |
| 2010/0161894 A1 | 6/2010 | Singh |
| 2010/0246588 A1 | 9/2010 | Davis |
| 2010/0293327 A1 | 11/2010 | Lin et al. |
| 2011/0002340 A1 | 1/2011 | Davis |
| 2011/0044340 A1 | 2/2011 | Bansal et al. |
| 2011/0110237 A1 | 5/2011 | Wong et al. |
| 2011/0173386 A1 | 7/2011 | Milliken et al. |
| 2012/0023309 A1 | 1/2012 | Abraham et al. |
| 2012/0026868 A1 | 2/2012 | Chang et al. |
| 2012/0163389 A1 | 6/2012 | Zhang et al. |
| 2012/0236722 A1 | 9/2012 | Patel et al. |

FOREIGN PATENT DOCUMENTS

| | | |
|---|---|---|
| JP | 2004-537871 A | 12/2004 |
| WO | WO 01/84728 A1 | 11/2001 |
| WO | WO 02/41544 A3 | 5/2002 |

OTHER PUBLICATIONS

Non-Final Office Action for U.S. Appl. No. 11/831,950, mailed on Aug. 26, 2011, 45 pages.
Final Office Action for U.S. Appl. No. 11/953,742, mailed on Oct. 26, 2011, 19 pages.
Notice of Allowance for U.S. Appl. No. 11/779,778, mailed on Jul. 28, 2011, 9 pages.
Non-Final Office Action for U.S. Appl. No. 11/668,322, mailed on Aug. 30, 2011 17 pages.
Non-Final Office Action for U.S. Appl. No. 11/745,008, mailed on Sep. 14, 2011, 26 pages.
Final Office Action for U.S. Appl. No. 12/795,492, mailed on Jul. 20, 2011, 11 pages.
Notice of Allowance for U.S. Appl. No. 12/795,492, mailed on Nov. 14, 2011, 10 pages.
Final Office Action for U.S. Appl. No. 12/198,710, mailed on Oct. 19, 2011, 58 pages.
Final Office Action for U.S. Appl. No. 12/070,893, mailed on Sep. 21, 2011, 12 pages.
Requirement for Restriction/Election for U.S. Appl. No. 12/466,277, mailed on Aug. 9, 2011, 6 pages.
Notice of Allowance for U.S. Appl. No. 12/466,277, mailed on Nov. 2, 2011, 47 pages.
10 Gigabit Ethernet—Technology Overview White Paper, Sep. 2001, 16 pages.
10 Gigabit Ethernet, Interconnection with Wide Area Networks, Version 1.0, Mar. 2002, 5 pages.
ANSI/IEEE Standard 802.1D, 1998, 373 pages.
Belhadj et al., "Feasibility of a 100GE MAC," PowerPoint Presentation, IEEE Meeting, Nov. 13-15, 2006, 18 pages.
Braun et al., "Fast incremental CRC updates for IP over ATM networks," IEEE Workshop on High Performance Switching and Routing, 2001, 6 pages.
Degermark, et al., "Small Forwarding Tables for Fast Routing Lookups," ACM Computer Communications Review, Oct. 1997, pp. 3-14, vol. 27, No. 4.
Foundry Networks, "BigIron Architecture Technical Brief," Oct. 1998, 15 pages, version 1.0.
Foundry Networks, "BigIron Architecture Technical Brief," Oct. 1998, 15 pages, version 1.02.
Foundry Networks, "BigIron Architecture Technical Brief," Dec. 1998, 14 pages, version 1.03.
Foundry Networks, "BigIron Architecture Technical Brief," May 1999, 15 pages, version 2.0.
Foundry Networks, "BigIron Architecture Technical Brief," May 1999, 15 pages, Version 2.01.
Foundry Networks, "BigIron Architecture Technical Brief," Jul. 2001, 16 pages, Version 2.02.
Foundry Networks, "Next Generation Terabit System Architecture—The High Performance Revolution for 10 Gigabit Networks," Nov. 17, 2003, 27 pages.
Gigabit Ethernet Alliance—"Accelerating the Standard for Speed," Copyright 1999, 19 pages.
Kichorowsky, et al., "Mindspeed.TM. Switch Fabric Offers the Most Comprehensive Solution for Multi-Protocol Networking Equipment," Apr. 30, 2001, 3 pages.
Matsumoto, et al., "Switch Fabrics Touted At Interconnects Conference," Aug. 21, 2000, printed on Aug. 12, 2002, at URL: http://www.eetimes.com/story/OEG20000821S0011, 2 pages.
McAuley, et al., "Fast Routing Table Lookup Using CAMs," Proceedings of INFOCOM, Mar.-Apr. 1993, pp. 1382-1391.
Foundry Networks, "JetCore™ Based Chassis Systems—An Architecture Brief on NetIron, BigIron, and FastIron Systems," Jan. 17, 2003, 27 pages.
Mier Communications, Inc., "Lab Testing Summary Report—Product Category: Layer-3 Switches, Vendor Tested:, Product Tested: Foundry Networks, BigIron 4000," Report No. 231198, Oct. 1998, 6 pages.
Mier Communications, Inc.,"Lab Testing Summary Report—Product Category: Gigabit Backbone Switches, Vendor Tested: Foundry Networks, Product Tested: BigIron 4000," Report No. 210998, Sep. 1998, 6 pages.
Mindspeed—A Conexant Business, "Switch Fabric Chipset—CX27300 iScale.TM.," Apr. 30, 2001, 2 pages.
Mindspeed—A Conexant Business, "17×17 3.2 Gbps Crosspoint Switch with Input Equalization—M21110," Feb. 1, 2001, 2 pages.
Newton, Newton's Telecom Dictionary, CMP Books, Mar. 2004, 20th Ed., p. 617.
Satran, et al., "Out of Order Incremental CRC Computation," IEEE Transactions on Computers, Sep. 2005, vol. 54, Issue 9, 11 pages.
Spurgeon, "Ethernet, The Definitive Guide," O'Reilly & Associates, Inc., Sebastapol, CA, Feb. 2000.
The Tolly Group, "Foundry Networks, Inc.—BigIron 4000, Layer 2 & Layer 3 Interoperability Evaluation," No. 199133, Oct. 1999, 4 pages.
The Tolly Group, "Foundry Networks, Inc.—BigIron 8000 Gigabit Ethernet Switching Router, Layer 2 & Layer 3 Performance Evaluation," No. 199111, May 1999, 4 pages.
International Search Report for Application No. PCT/US2001/043113, mailed Dec. 13, 2002, 2 pages.
Written Opinion of the International Searching Authority for Application No. PCT/US2001/043113, mailed May 1, 2003, 6 pages.
International Preliminary Examination Report for Application No. PCT/US2001/043113, mailed Nov. 6, 2003, 6 pages.
International Search Report for Application No. PCT/US03/08719, mailed Jun. 17, 2003. 1 page.
U.S. Appl. No. 12/883,073, Flexible Method for Processing Data Packets in a Network Routing System for Enhanced Efficiency and Monitoring Capability, filed Sep. 15, 2010, Davis.
U.S. Appl. No. 12/880,518, Method and Apparatus for Aggregating Input Data Streams, filed September 13, 2010, Wong.
U.S. Appl. No. 12/417,913, Backplane Interface Adapter With Error Control and Redundant Fabric, filed Apr. 3, 2009, Patel et al.
U.S. Appl. No. 12/198,710, Techniques for Selecting Paths and/or Trunk Ports for Forwarding Traffic Flows, filed Aug. 26, 2008, Zhang et al.
U.S. Appl. No. 12/198,697, Selection of Trunk Ports and Paths Using Rotation, filed Aug. 26, 2008, Hsu et al.
U.S. Appl. No. 11/724,965, filed Mar. 15, 2007, Chang et al.
U.S. Appl. No. 11/586,991, Hitless Management Failover, filed Oct. 25, 2006, Ramanathan et al.
U.S. Appl. No. 10/832,086, System and Method for Optimizing Router Lookup, filed Apr. 26, 2004, Wong.

(56) References Cited

OTHER PUBLICATIONS

U.S. Appl. No. 10/141,223, Apparatus & Method of Processing Packets Under the Gigabit Ethernet Protocol in a Communications Network, filed May 7, 2002, Veerabadran et al.

U.S. Appl. No. 10/140,753, Integrated Adapter for a Network Routing System With Enhanced Efficiency and Monitoring Capability, filed May 6, 2002, Davis et al.

U.S. Appl. No. 10/140,751, Method and Apparatus for Efficiently Processing Data Packets in a Computer Network, filed May 6, 2002, Davis.

Non-Final Office Action for U.S. Appl. No. 09/855,024. mailed Jun. 4, 2002, 10 pages.

Final Office Action for U.S. Appl. No. 09/855,024, mailed Jan. 15, 2003, 20 pages.

Advisory Action for U.S. Appl. No. 09/855,024, mailed May 2, 2003.

Notice of Allowance for U.S. Appl. No. 09/855,024, mailed Nov. 3, 2003.

Notice of Allowance for U.S. Appl. No. 09/855,024, mailed Dec. 15, 2003. 6 pages.

Non-Final Office Action for U.S. Appl. No. 10/810,301, mailed Mar. 17, 2005, 11 pages.

Non-Final Office Action for U.S. Appl. No. 10/810,301, mailed Feb. 16, 2006, 12 pages.

Notice of Allowance for U.S. Appl. No. 10/810,301, mailed Feb. 6, 2007, 9 pages.

Non-Final Office Action for U.S. Appl. No. 09/855,025, mailed Nov. 23, 2004, 17 pages.

Non-Final Office Action for U.S. Appl. No. 09/855,031, mailed May 22, 2002.

Non-Final Office Action for U.S. Appl. No. 09/855,031, mailed Dec. 10, 2002.

Final Office Action for U.S. Appl. No. 09/855,031, mailed Jul. 30, 2003.

Notice of Allowance for U.S. Appl. No. 09/855,031, mailed Nov. 4, 2003.

Non-Final Office Action for U.S. Appl. No. 10/736,680, mailed Feb. 16, 2006, 18 pages.

Final Office Action for U.S. Appl. No. 10/736,680, mailed Aug. 3, 2006, 10 pages.

Notice of Allowance for U.S. Appl. No. 10/736,680, mailed Feb. 22, 2007, 12 pages.

Non-Final Office Action for U.S. Appl. No. 10/210,041, mailed Sep. 10, 2003, 12 pages.

Final Office Action for U.S. Appl. No. 10/210,041, mailed Jan. 7, 2004, 14 pages.

Non-Final Office Action for U.S. Appl. No. 10/210,041, mailed Mar. 11, 2004, 12 pages.

Final Office Action for U.S. Appl. No. 10/210,041, mailed Jul. 7, 2004, 13 pages.

Non-Final Office Action for U.S. Appl. No. 10/210,041, mailed Feb. 9, 2005, 7 pages.

Final Office Action for U.S. Appl. No. 10/210,041, mailed Aug. 24, 2005, 7 pages.

Advisory Action for U.S. Appl. No. 10/210,041, mailed Dec. 13, 2005, 4 pages.

Non-Final Office Action for U.S. Appl. No. 10/210,108, mailed Jun. 12, 2003, 6 pages.

Notice of Allowance for U.S. Appl. No. 10/210,108, mailed Oct. 7, 2003.

Requirement for Restriction/Election for U.S. Appl. No. 10/438,545, mailed Oct. 31, 2003.

Non-Final Office Action for U.S. Appl. No. 10/438,545, mailed Dec. 12, 2003, 7 pages.

Notice of Allowance for U.S. Appl. No. 10/438,545, mailed Jun. 15, 2004, 4 pages.

Non-Final Office Action for U.S. Appl. No. 10/832,086, mailed Sep. 19, 2007, 12 pages.

Final Office Action for U.S. Appl. No. 10/832,086, mailed May 1, 2008, 31 pages.

Advisory Action for U.S. Appl. No. 10/832,086, mailed Jul. 21, 2008, 4 pages.

Non-Final Office Action for U.S. Appl. No. 10/832,086, mailed Sep. 18, 2008, 18 pages.

Non Final Office Action for U.S. Appl. No. 10/832,086, mailed Apr. 1, 2009, 17 pages.

Final Office Action for U.S. Appl. No. 10/832,086, mailed Sep. 29, 2009, 26 pages.

Non-Final Office Action for U.S. Appl. No. 11/586,991, mailed Oct. 2, 2008, 23 pages.

Non-Final Office Action for U.S. Appl. No. 11/646,845, mailed Oct. 4, 2010, 48 pages.

Non-Final Office Action for U.S. Appl. No. 11/831,950, mailed Aug. 18, 2009, 49 pages.

Final Office Action for U.S. Appl. No. 11/831,950, mailed Jan. 6, 2010, 21 pages.

Advisory Action for U.S. Appl. No. 11/831,950, mailed Mar. 4, 2010, 4 pages.

Non-Final Office Action for U.S. Appl. No. 11/953,742, mailed on Nov. 19, 2009, 51 pages.

Final Office Action for U.S. Appl. No. 11/953,742, mailed Jun. 14, 2010, 21 pages.

Non-Final Office Action for U.S. Appl. No. 11/953,743, mailed Nov. 23, 2009, 47 pages.

Final Office Action for U.S. Appl. No. 11/953,743, mailed Jul. 15, 2010, 21 pages.

Non-Final Office Action for U.S. Appl. No. 11/953,745, mailed Nov. 24, 2009, 48 pages.

Non-Final Office Action for U.S. Appl. No. 11/953,745, mailed Jun. 14, 2010, 19 pages.

Non-Final Office Action for U.S. Appl. No. 11/953,751, mailed Nov. 16, 2009, 55 pages.

Final Office Action for U.S. Appl. No. 11/953,751, mailed Jun. 25, 2010, 24 pages.

Non-Final Office Action for U.S. Appl. No. 11/779,778, mailed Feb. 2, 2011, 63 pages.

Non-Final Office Action for U.S. Appl. No. 11/779,714, mailed Sep. 1, 2009, 58 pages.

Non-Final Office Action for U.S. Appl. No. 11/779,714, mailed Mar. 31, 2010, 26 pages.

Final Office Action for U.S. Appl. No. 11/779,714, mailed Nov. 9, 2010, 24 pages.

Non-Final Office Action for U.S. Appl. No. 10/810,208, mailed Jul. 16, 2007, 24 pages.

Non-Final Office Action for U.S. Appl. No. 10/810,208, mailed Dec. 18, 2007, 40 pages.

Final Office Action for U.S. Appl. No. 10/810,208, mailed Jun. 11, 2008, 34 pages.

Advisory Action for U.S. Appl. No. 10/810,208, mailed Aug. 27, 2008, 4 pages.

Non-Final Office Action for U.S. Appl. No. 10/810,208, mailed Feb. 13, 2009, 17 pages.

Non-Final Office Action for U.S. Appl. No. 10/810,208, mailed Aug. 24, 2009, 38 pages.

Non-Final Office Action for U.S. Appl. No. 10/810,208, mailed Feb. 5, 2010, 13 pages.

Notice of Allowance for U.S. Appl. No. 10/810,208, mailed Jul. 15, 2010, 15 pages.

Requirement for Restriction/Election for U.S. Appl. No. 10/140,752, mailed May 18, 2006, 8 pages.

Non-Final Office Action for U.S. Appl. No. 10/140,752, mailed Dec. 14, 2006, 17 pages.

Non-Final Office Action for U.S. Appl. No. 10/140,752, mailed Apr. 23, 2007, 6 pages.

Non-Final Office Action for U.S. Appl. No. 10/140,752, mailed Jan. 24, 2008, 8 pages.

Notice of Allowance of U.S. Appl. No. 10/140,752, mailed Jul. 24, 2008, 14 pages.

Notice of Allowance of U.S. Appl. No. 10/140,752, mailed Sep. 10, 2008, 4 pages.

Non-Final Office Action for U.S. Appl. No. 11/668,322, mailed Mar. 23, 2009, 19 pages.

(56) References Cited

OTHER PUBLICATIONS

Requirement for Restriction/Election for U.S. Appl. No. 11/668,322, mailed Oct. 29, 2009, 6 pages.
Final Office Action for U.S. Appl. No. 11/668,322, mailed Feb. 24, 2010, 33 pages.
Non-Final Office Action for U.S. Appl. No. 11/668,322, mailed Jun. 22, 2010, 16 pages.
Final Office Action for U.S. Appl. No. 11/668,322, mailed Feb. 1, 2011, 17 pages.
Non-Final Office Action for U.S. Appl. No. 11/854,486, mailed Jul. 20, 2009, 29 pages.
Non-Final Office Action for U.S. Appl. No. 11/854,486, mailed Jan. 12, 2010, 23 pages.
Notice of Allowance for U.S. Appl. No. 11/854,486, mailed Jul. 13, 2010, 12 pages.
Non-Final Office Action for U.S. Apppl. No. 10/139,912, mailed Jan. 25, 2006, 14 pages.
Final Office Action for U.S. Appl. No. 10/139,912, mailed Aug. 11, 2006, 26 pages.
Non-Final Office Action for U.S. Appl. No. 10/139,912, mailed Apr. 20, 2007, 20 pages.
Final Office Action for U.S. Appl. No. 10/139,912, mailed Nov. 28, 2007, 20 pages.
Non-Final Office Action for U.S. Appl. No. 10/139,912, mailed Aug. 1, 2008, 21 pages.
Notice of Allowance for U.S. Appl. No. 10/139,912, mailed Feb. 5, 2009, 8 pages.
Notice of Allowance for U.S. Appl. No. 10/139,912, mailed Jun. 8, 2009, 8 pages.
Notice of Allowance for U.S. Appl. No. 10/139,912, mailed Oct. 19, 2009, 17 pages.
Supplemental Notice of Allowance for U.S Appl. No. 10/139,912, mailed Nov. 23, 2009, 4 pages.
Requirement for Restriction/Election for U.S. Appl. No. 10/140,751, mailed Apr. 27, 2006, 5 pages.
Non-Final Office Action for U.S. Appl. No. 10/140,751, mailed Aug. 10, 2006, 15 pages.
Final Office Action for U.S. Appl. No. 10/140,751, mailed Apr. 10, 2007, 16 pages.
Non-Final Office Action for U.S. Appl. No. 10/140,751, mailed Oct. 30, 2007, 14 pages.
Final Office Action for U.S. Appl. No. 10/140,751, mailed May 28, 2008, 19 pages.
Non-Final Office Action for U.S. Appl. No. 10/140,751, mailed Sep. 17, 2008, 15 pages.
Final Office Action for U.S. Appl. No. 10/140,751, mailed Mar. 17, 2009, 17 pages.
Advisory Action for U.S. Appl. No. 10/140,751, mailed Jun. 1, 2009, 3 pages.
Non-Final Office Action for U.S. Appl. No. 10/140,751, mailed Sep. 28, 2009, 34 pages.
Final Office Action for U.S. Appl. No. 10/140,751, mailed Mar. 25, 2010, 29 pages.
Non-Final Office Action for U.S. Appl. No. 10/140,751, mailed Dec. 20, 2010, 23 pages.
Non-Final Office Action for U.S. Appl. No. 11/745,008, mailed May 14, 2009, 27 pages.
Final Office Action for U.S. Appl. No. 11/745,008, mailed Dec. 30, 2009, 27 pages.
Advisory Action for U.S. Appl. No. 11/745,008, mailed Apr. 21, 2010, 8 pages.
Non-Final Office Action for U.S. Appl. No. 10/141,223, mailed Feb. 23, 2006, 25 pages.
Non-Final Office Action for U.S. Appl. No. 10/141,223, mailed Feb. 13, 2007, 29 pages.
Final Office Action for U.S. Appl. No. 10/141,223, mailed Aug. 21, 2007, 25 pages.
Non-Final Office Action for U.S. Appl. No. 10/141,223, mailed Dec. 28, 2007, 13 pages.
Non-Final Office Action for U.S. Appl. No. 10/141,223, mailed Sep. 3, 2008, 22 pages.
Non-Final Office Action for U.S. Appl. No. 10/139,831, mailed Oct. 17, 2005, 7 pages.
Notice of Allowance for U.S. Appl. No. 10/139,831, mailed Feb. 9, 2006, 7 pages.
Non-Final Office Action for U.S. Appl. No. 10/139,831, mailed Jun. 27, 2006, 9 pages.
Final Office Action for U.S. Appl. No. 10/139,831, mailed Nov. 28, 2006, 17 pages.
Notice of Allowance for U.S. Appl. No. 10/139,831, mailed Jun. 14, 2007, 26 pages.
Notice of Allowance for U.S. Appl. No. 10/139,831, mailed Jun. 26, 2007, 25 pages.
Non-Final Office Action for U.S. Appl. No. 11/828,246, mailed Jun. 15, 2009, 26 pages.
Notice of Allowance for U.S. Appl. No. 11/828,246, mailed Nov. 16, 2009, 20 pages.
Non-Final Office Action for U.S. Appl. No. 10/140,088, mailed Apr. 27, 2006, 13 pages.
Notice of Allowance for U.S. Appl. No. 10/140,088, mailed Sep. 7, 2006, 13 pages.
Notice of Allowance for U.S. Appl. No. 10/140,088, mailed Oct. 24, 2006, 8 pages.
Notice of Allowance for U.S. Appl. No. 10/140,088, mailed Jan. 11, 2007, 5 pages.
Non-Final Office Action for U.S. Appl. No. 11/621,038, mailed Apr. 23, 2009, 44 pages.
Final Office Action for U.S. Appl. No. 11/621,038, mailed Dec. 23, 2009, 27 pages.
Notice of Allowance for U.S. Appl. No. 11/621,038, mailed Apr. 28, 2010, 15 pages.
Non-Final Office Action for U.S. Appl. No. 12/795,492, mailed Mar. 17, 2011, 51 pages.
Non-Final Office Action for U.S. Appl. No. 12/198,697, mailed Feb. 2, 2010, 50 pages.
Final Office Action for U.S. Appl. No. 12/198,697, mailed Aug. 2, 2010, 55 pages.
Non-Final Office Action for U.S. Appl. No. 12/198,697, mailed Oct. 25, 2010, 36 pages.
Non-Final Office Action for U.S. Appl. No. 10/140,749, mailed Aug. 10, 2006, 22 pages.
Final Office Action for U.S. Appl. No. 10/140,749, mailed Jun. 27, 2007, 23 pages.
Final Office Action for U.S. Appl. No. 10/140,749, mailed Jan. 8, 2008, 23 pages.
Non-Final Office Action for U.S. Appl. No. 10/140,749, mailed Jun. 6, 2008, 28 pages.
Final Office Action for U.S. Appl. No. 10/140,749, mailed Dec. 8, 2008, 30 pages.
Non-Final Office Action for U.S. Appl. No. 10/140,749, mailed May 27, 2009, 38 pages.
Final Office Action for U.S. Appl. No. 10/140,749, mailed Jan. 13, 2010, 44 pages.
Non-Final Office Action for U.S. Appl. No. 10/140,753, mailed Apr. 20, 2006, 11 pages.
Final Office Action for U.S. Appl. No. 10/140,753, mailed Jan. 10, 2007, 27 pages.
Non-Final Office Action for U.S. Appl. No. 10/140,753, mailed Aug. 22, 2007, 14 pages.
Non-Final Office Action for U.S. Appl. No. 10/140,753, mailed Jan. 8, 2008, 14 pages.
Final Office Action for U.S. Appl. No. 10/140,753, mailed Aug. 25, 2008, 22 pages.
Non-Final Office Action for U.S. Appl. No. 12/198,710, mailed Sep. 28, 2010, 15 pages.
Requirement for Restriction/Election for U.S. Appl. No. 11/000,359, mailed Jun. 20, 2008, 7 pages.
Non-Final Office Action for U.S. Appl. No. 11/000,359, mailed Oct. 23, 2008, 28 pages.
Non-Final Office Action for U.S. Appl. No. 11/000,359, mailed May 29, 2009, 14 pages.

(56) References Cited

OTHER PUBLICATIONS

Notice of Allowance for U.S. Appl. No. 11/000,359, mailed Sep. 22, 2009, 17 pages.
Requirement for Restriction/Election for U.S. Appl. No. 11/118,697, mailed Jun. 2, 2009, 8 pages.
Notice of Allowance for U.S. Appl. No. 11/118,697, mailed Sep. 30, 2009, 41 pages.
Requirement for Restriction/Election for U.S. Appl. No. 12/639,749, mailed Dec. 7, 2010, 3 pages.
Notice of Allowance for U.S. Appl. No. 12/639,749, mailed Feb. 11, 2011, 51 pages.
Non-Final Office Action for U.S. Appl. No. 12/639,762, mailed Sep. 1, 2010, 40 pages.
Notice of Allowance for U.S. Appl. No. 12/639,762, mailed Mar. 4, 2011, 7 pages.
Non-Final Office Action for U.S. Appl. No. 09/855,038, mailed Jun. 2, 2005, 14 pages.
Final Office Action for U.S. Appl. No. 09/855,038, mailed Feb. 7, 2006, 8 pages.
Non-Final Office Action for U.S. Appl. No. 09/855,038, mailed Oct. 4, 2006, 14 pages.
Notice of Allowance for U.S. Appl. No. 09/855,038, mailed Apr. 26, 2007, 8 pages.
Requirement for Restriction/Election for U.S. Appl. No. 09/988,066, mailed Dec. 13, 2005, 7 pages.
Non-Final Office Action for U.S. Appl. No. 09/988,066, mailed Jul. 14, 2006, 17 pages.
Non-Final Office Action for U.S. Appl. No. 09/988,066, mailed Apr. 6, 2007, 22 pages.
Final Office Action for U.S. Appl. No. 09/988,066, mailed Oct. 31, 2007, 16 pages.
Advisory Action for U.S. Appl. No. 09/988,066, mailed May 28, 2008, 4 pages.
Notice of Allowance for U.S. Appl. No. 09/988,066, mailed Oct. 30, 2008, 16 pages.
Notice of Allowance for U.S. Appl. No. 09/988,066, mailed Jan. 9, 2009.
Non Final Office Action U.S. Appl. No. 11/804,977, mailed Jan. 14, 2008, 13 pages.
Notice of Allowance for U.S. Appl. No. 11/804,977, mailed Nov. 19, 2008, 17 pages.
Non-Final Office Action for U.S. Appl. No. 12/400,594, mailed May 14, 2010, 53 pages.
Final Office Action for U.S. Appl. No. 12/400,594, mailed Oct. 28, 2010, 13 pages.
Non-Final Office for U.S. Appl. No. 12/400,645, mailed Sep. 1, 2010, 45 pages.
Notice of Allowance for U.S. Appl. No. 12/400,645, mailed Jan. 26, 2011, 14 pages.
Non-Final Office Action for U.S. Appl. No. 12/372,390, mailed Apr. 22, 2010, 46 pages.
Non-Final Office Action for U.S. Appl. No. 12/372,390, mailed Sep. 13, 2010, 10 pages.
Notice of Allowance for U.S. Appl. No. 12/372,390, mailed Mar. 9, 2011, 8 pages.
Non-Final Office Action for U.S. Appl. No. 12/505,390, mailed Oct. 28, 2010, 51 pages.
Non-Final Office Action for U.S. Appl. No. 09/855,015, mailed Oct. 28, 2004, 12 pages.
Non-Final Office Action for U.S. Appl. No. 09/855,015, mailed Jan. 12, 2006, 6 pages.
Notice of Allowance for U.S. Appl. No. 09/855,015, mailed Sep. 8, 2006, 3 pages.
Requirement for Restriction/Election for U.S. Appl. No. 09/855,015, mailed Nov. 3, 2006, 6 pages.
Notice of Allowance for U.S. Appl. No. 09/855,015, mailed Jan. 7, 2008, 4 pages.
Supplemental Notice of Allowance for U.S. Appl. No. 09/855,015, mailed Feb. 4, 2008, 3 pages.
Non-Final Office Action for U.S. Appl. No. 12/070,893, mailed Jun. 10, 2010, 44 pages.
Final Office Action for U.S. Appl. No. 12/070,893, mailed Nov. 24, 2010, 11 pages.
Non-Final Office Action for U.S. Appl. No. 12/070,893, mailed Mar. 18, 2011, 7 pages.
Non-Final Office Action for U.S. Appl. No. 11/611,067, mailed Feb. 20, 2009, 11 pages.
Final Office Action for U.S. Appl. No. 11/611,067, mailed Oct. 16, 2009, 35 pages.
Non-Final Office Action for U.S. Appl. No. 11/611,067, mailed Dec. 8, 2009, 11 pages.
Non-Final Office Action for U.S. Appl. No. 11/615,769, mailed Apr. 15, 2009, 11 pages.
Final Office Action for U.S. Appl. No. 11/615,769, mailed Jan. 22, 2010, 34 pages.
Advisory Action for U.S. Appl. No. 11/615,769, mailed May 25, 2010, 3 pages.
Notice of Allowance for U.S. Appl. No. 11/615,769, mailed Jul. 12, 2010, 14 pages.
Davis, et al., "Pipeline Method and System for Switching Packets," U.S. Appl. No. 13/398,725, filed Feb. 16, 2012, 51 pages.
Hsu, et al., "Selection of Trunk Ports and Paths Using Rotation," U.S. Appl. No. 13/407,397, filed Feb. 28, 2012, 30 pages.
Final Office Action for U.S. Appl. No. 11/831,950, mailed Feb. 28, 2012, 20 pages.
Notice of Allowance for U.S. Appl. No. 11/831,950, mailed May 16, 2012, 11 pages.
Notice of Allowance for U.S. Appl. No. 11/953,751, mailed Dec. 7, 2011, 12 pages.
Supplemental Notice of Allowance for U.S. Appl. No. 11/953,751, mailed Dec. 27, 2011, 6 pages.
Notice of Allowance for U.S. Appl. No. 11/668,322, mailed Feb. 10, 2012, 20 pages.
Notice of Allowance for U.S. Appl. No. 12/198,697, mailed Nov. 28, 2011, 12 pages.
Notice of Allowance for U.S. Appl. No. 12/198,697, mailed Jan. 5, 2012, 4 pages.
Non-Final Office Action for U.S. Appl. No. 13/083,481, mailed Dec. 1, 2011, 7 pages.
Final Office Action for U.S. Appl. No. 11/646,845, mailed on Jun. 9, 2011, 22 pages.
Non-Final Office Action for U.S. Appl. No. 11/953,742, mailed on Mar. 30, 2011, 23 pages.
Notice of Allowance for U.S. Appl. No. 11/953,743, mailed on Apr. 28, 2011, 19 pages.
Non-Final Office Action for U.S. Appl. No. 11/953,751, mailed on Mar. 29, 2011, 29 pages.
Final Office Action for U.S. Appl. No. 10/140,751, mailed on Jun. 28, 2011, 23 pages.
Non-Final Office Action for U.S. Appl. No. 12/702,031, mailed on Apr. 29, 2011, 5 pages.
Non-Final Office Action for U.S. Appl. No. 12/198,697, mailed on May 20, 2011, 43 pages.
Non-Final Office Action for U.S. Appl. No. 12/198,710, mailed on Mar. 24, 2011, 40 pages.
Notice of Allowance for U.S. Appl. No. 12/400,594, mailed on Mar. 23, 2011, 11 pages.
Gupta et al., "Packet Classification on Multiple Fields," SIGCOMM '99, Aug. 1999, pp. 147-160, ACM, Cambridge, MA.
Final Office Action for U.S. Appl. No. 11/745,008, mailed on Jun. 28, 2012.
Final Office Action for U.S. Appl. No. 11/646,845, mailed on Jul. 5, 2012, 21 pages.
Non-Final Office Action for U.S. Appl. No. 12/900,279 mailed Aug. 30, 2012, 9 pages.
Non-Final Office Action for U.S. Appl. No. 12/198,710 mailed Sep. 13, 2012, 18 pages.
Non-Final Office Action for U.S. Appl. No. 13/083,481 mailed Oct. 4, 2012, 9 pages.
Non-Final Office Action for U.S. Appl. No. 12/880,518 mailed Oct. 30, 2012, 7 pages.

(56) References Cited

OTHER PUBLICATIONS

Non-Final Office Action for U.S. Appl. No. 13/152,715 mailed on Nov. 13, 2012, 6 pages.
Notice of Allowance for U.S. Appl. No. 11/953,742 mailed on Nov. 13, 2012, 7 pages.
Non-Final Office Action for U.S. Appl. No. 13/398,725 mailed on Nov. 28, 2012, 10 pages.
Final Office Action for U.S. Appl. No. 12/900,279 mailed on Dec. 5, 2012, 8 pages.
Non-Final Office Action for U.S. Appl. No. 12/264,300 mailed on Dec. 31, 2012, 13 pages.
Notice of Allowance for U.S. Appl. No. 11/646,845 mailed on Jan. 8, 2013, 8 pages.
Requirement for Restriction/Election for U.S. Appl. No. 12/608,972, mailed May 17, 2012, 5 pages.
Notice of Allowance for U.S. Appl. No. 11/779,714, mailed on Jun. 18, 2012, 9 pages.
Cisco, "*Identifying Slots and Subslots for the Cisco 7600 Series Ethernet Services 20G Line Card*", Chapter 2, Configuring the Cisco 7600 Series Ethernet Services 20G Line Card Configuration Guide, Feb. 2007, 14 pages.
Nortel, "*Nortel Metro Ethernet Routing Switch 8600. Configuration—UNI and Endpoints for non-PBT VPN*", Aug. 3, 2007, Copyright © 2007, Nortel Networks, 198 pages.
Extreme Networks, Inc., "*ExtremeXOS Concepts Guide*", Software Version 12.0, Jul. 2007, 1174 pages.
Notice of Allowance for U.S. Appl. No. 10/810,301, mailed Jul. 28, 2006, 5 pages.
Non-Final Office Action for U.S. Appl. No. 13/083,481 mailed on Mar. 1, 2013, 14 pages.
Non-Final Office Action for U.S. Appl. No. 11/745,008 mailed on Mar. 7, 2013, 18 pages.
Final Office Action for U.S. Appl. No. 12/198,710 mailed on Mar. 21, 2013, 17 pages.
Non-Final Office Action for U.S. Appl. No. 12/900,279 mailed on Apr. 11, 2013, 7 pages.
Non-Final Office Action for U.S. Appl. No. 13/548,116 mailed on Apr. 15, 2013, 8 pages.
Notice of Allowance for U.S. Appl. No. 12/198,710 mailed on May 28, 2013, 10 pages.
Non-Final Office Action for U.S. Appl. No. 12/608,985 mailed on May 31, 2013, 9 pages.
Non-Final Office Action for U.S. Appl. No. 13/398,725 mailed on Aug. 30, 2013, 8 pages.
Notice of Allowance for U.S. Appl. No. 13/083,481 mailed on Sep. 3, 2013, 9 pages.
Non-Final Office Action for U.S. Appl. No. 10/832,086 mailed on Sep. 9, 2013, 13 pages.
Non-Final Office Action for U.S. Appl. No. 12/608,972 mailed on Sep. 16, 2013, 6 pages.
Non-Final Office Action for U.S. Appl. No. 13/458,650 mailed on Oct. 2, 2013, 5 pages.
Notice of Allowance for U.S. Appl. No. 11/745,008 mailed on Oct. 7, 2013, 9 pages.

\* cited by examiner

PROVISIONING SINGLE OR MULTISTAGE NETWORKS USING ETHERNET SERVICE INSTANCES (ESIS)

CROSS-REFERENCES TO RELATED APPLICATIONS

The present application is a non-provisional of and claims the benefit and priority under 35 U.S.C. 119(e) of U.S. Provisional Application No. 61/244,393 filed Sep. 21, 2009 entitled PROVISIONING USING ETHERNET SERVICE INSTANCES INA A SINGLE OR A MULTISTAGE NETWORK, the entire contents of which are incorporated herein by reference for all purposes.

BACKGROUND

Embodiments of the present invention relate to network provisioning, and more particularly to techniques for provisioning single or multistage networks.

Typically, in data centers and carrier Ethernet networks where single or multistage networks are created, a network operator has to provision the overall network quality of service, bandwidth, network packet encapsulations, etc. at each network stage. Because of a multitude of network protocols and individual network capabilities that are potentially available at each stage, it is difficult to specify a provisioning framework which configures these network operations at each stage, binds them together with packet modifications, and validates overall configuration with configuration elements at each stage.

Provisioning systems typically involve configuration of network protocol packet processing and service parameters at each port in each networking system. After network configuration is done at each port, a separate command has to be used to bind two adjacent ports so that the two ports can communicate using an appropriate network packet format. In a multistage network, an operator has to ensure that each such port-pair is configured properly and also that the entire system, composed of multiple such port pairs, also is configured correctly. Whenever there is any change in any of the port-pairs, the overall system operation and network service allocation may fail without knowledge of the operator. For example, whenever a port is removed or moved to a new interface, configuration needs to be changed since all configuration parameters are tied to a port. Provisioning systems do not allow one to define rules of association of different network ports and packet formats for the entire system.

BRIEF SUMMARY

Embodiments of the present invention provide techniques for provisioning single or multistage networks using Ethernet Service Instances (ESIs). In one embodiment, an ESI is a logical entity or object that stores information that may be used to provision a network. An ESI may represent a logical entity that identifies a grouping of elements of a network or network device and associated attributes. Hierarchical relationships may be created between ESIs. The hierarchical relationships are used to perform packet-level processing including performing network packet encapsulations.

In one embodiment, techniques (including a system, a method, and a computer-readable storage medium storing instructions) are provided for configuring ESIs and using the ESIs to perform network provisioning. A set of service instances may be configured for a network device. For example, a first service instance may be configured, the first service instance comprising a set of one or more elements and a set of one or more attributes and associated values. The set of elements of the first service instance may comprise one or more L2/L3 parameters. A second service instance may be configured comprising a set of one or more elements. A hierarchical relationship may be created between the first service instance and the second service instance, the hierarchical relationship causing the second service instance to inherit the set of attributes of the first service instance and their associated values. Packet-level processing may then be performed based upon the hierarchical relationship.

In one embodiment, the packet-level processing may comprise modifying a packet based upon the hierarchical relationship between the first service instance and the second service instance. In one embodiment, the packet modifications may comprise adding a tag to the packet or removing a tag from the packet based upon the hierarchical relationship between the first service instance and the second service instance.

In one embodiment, the hierarchical relationship between the first service instance and the second service instance may be created by making the second service instance an element of the first service instance.

In one embodiment, the set of one or more attributes of the first service instance may comprise a first attribute associated with a first value. This attribute along with its associated value is inherited by the second service instance as a result of the hierarchical relationship created between the first service instance and the second service instance. The value of the attribute may be overridden in the second service instance. For example, the first attribute in the second service instance may be assigned a second value that is different from the first value assigned to the attribute in the first service instance.

The elements of a service instance may include one or more L2/L3 parameters. For example, the elements of a service instance may be VLANs and their associated ports. An ESI may comprise an attribute that identifies the type of the one or more VLANs that are elements of the ESI. In one embodiment, the type may be one of a customer VLAN (CVLAN), a service VLAN (SVLAN), a B-component VLAN (B-VLAN), or an I-component service ID (ISID). The attributes of an ESI may also include attributes related to quality of service (QoS), bandwidth allocation, and the like.

In one embodiment, the set of elements of the first service instance may comprise a first VLAN and its associated port and the set of attributes of the first service instance may comprise an attribute indicating a type of the first VLAN. The set of elements of the second service instance may comprise a second VLAN and its associated port. In one configuration, the first VLAN may be for a provider network and the second VLAN may be for a customer network. In another embodiment, the first VLAN may be for a first provider network and the second VLAN may be for a second provider network.

In one embodiment, each ESI can support up to 4096 VLANs. For example, the first service instance can support up to 4096 VLANs and the second service instance can support up to 4096 VLANs. As a result, the number of VLANs defined for a system of network device may be more than 4096 VLANs.

ESIs may be used for various types of network provisioning. For example, ESIs may be used for provisioning IEEE 802.1ah Provider Backbone bridging (PBB) networks or IEEE 802.1ad Provider Bridging (PB) networks.

The foregoing, together with other features and embodiments will become more apparent when referring to the following specification, claims, and accompanying drawings.

DETAILED DESCRIPTION

In the following description, for the purposes of explanation, specific details are set forth in order to provide a thorough understanding of embodiments of the invention. However, it will be apparent that the invention may be practiced without these specific details.

In one embodiment, the following glossary identifies the terms used in the present applications.

| | |
|---|---|
| CVLAN | Customer VLAN |
| PB | Provider Bridges (IEEE802.1ad) standard |
| PBB | Provider Backbone Bridges (IEEE802.1ah) standard |
| SVLAN | Service VLAN |
| C-ESI | ESI holding one or more CVLANs |
| S-ESI | ESI holding one or more SVLANs |
| I-ESI | ESI holding one or more I-tags (802.1ah) |
| B-ESI | ESI holding one or more B-tags (802.1ah) |
| Provider ESI | ESI that is provisioned on the provider side and may have one or more client ESIs associated with it. |
| Client (or Customer) ESI | An ESI provisioned for the client side. The ESI may be bound to another ESI configured for a provider. |
| ISID | I-Component Service ID for PBB (24-bit globally unique value) |
| BVLAN | B-component VLAN for PBB (12-bit locally unique value) provider backbone bridging |

Embodiments of the present invention provide techniques for provisioning single or multistage networks. In one embodiment, one or more Ethernet Service Instances (ESIs) may be defined and hierarchical relationships created between the ESIs to facilitate network provisioning in a simple and convenient manner.

Figure 1:
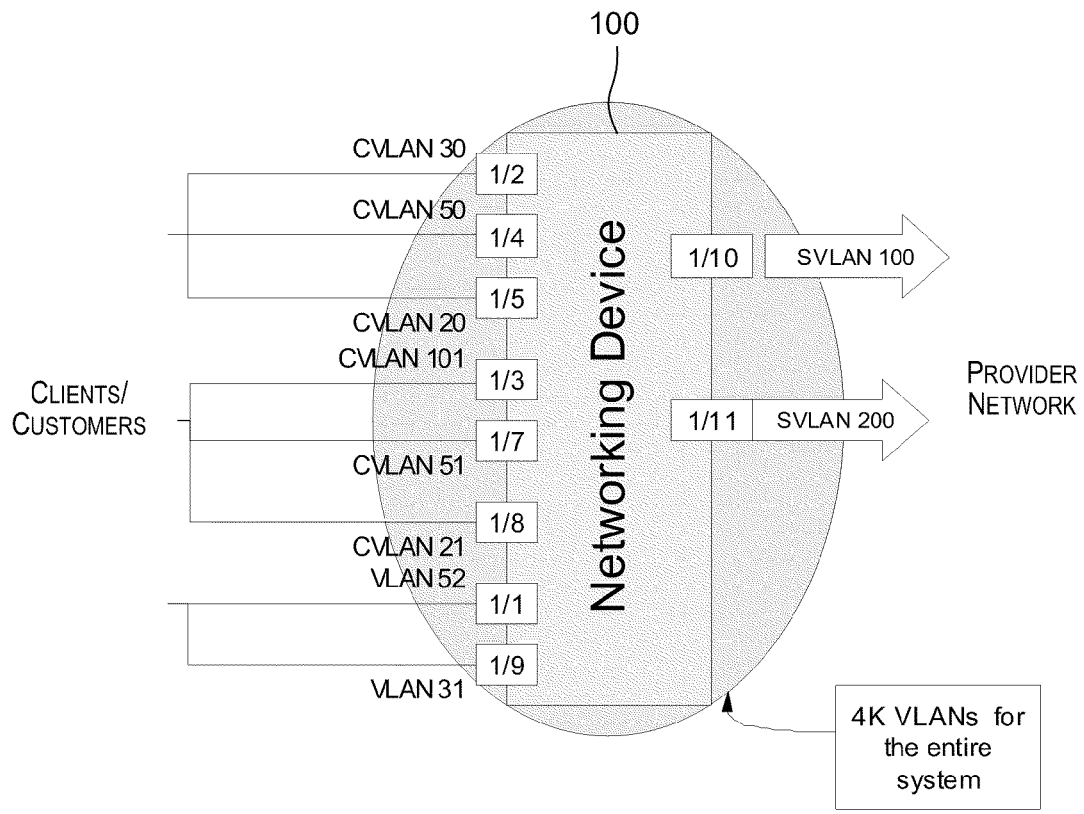
FIG. 1 depicts a network device that forms a boundary between a provider network and clients/customers.

In order to understand and appreciate the use of ESIs for network provisioning, it is helpful to consider how service provisioning is typically performed without an ESI framework. FIG. 1 depicts a network device 100 that forms a boundary between a provider network and clients/customers. Without an ESI-based framework, networking systems such as network device 100 are often limited to 4096 VLANs that are spread across different ports of the device. This is because a network device must identify a VLAN by its numeric value across the entire device. For example, a VLAN value of 100 can only occur once across all the ports of the network device. There could be a method for associating a port to a VLAN, but such an association is cumbersome and it is nearly impossible to distinguish the VLANs. For example, if VLAN 100 for a first customer is spread across ports 1/1 and 1/10, and a different VLAN 100 intended for another customer is configured on port 1/12 it becomes difficult to distinguish these two VLANs on the device. Moreover, if a network provider wishes to allocate the first customer's VLAN 100 on port 1/12 and move the second customer's VLAN 100 to another port, say on 1/10, the provider loses visibility on the VLAN allocations. Furthermore, when there are hierarchical encapsulations on a VLAN for a provider bridging, the CVLAN and the SVLAN values can be associated only on the basis of interconnection of the ports to which they are bound. When port associations change, entire configuration must be edited again.

According to one embodiment, an ESI is a logical entity or object that stores information that may be used to provision a network. An ESI may represent a logical entity that identifies a grouping of elements of a network or network device and associated attributes. For example, ESIs may be used to provide a virtual switch or may be used to perform provisioning of networks including Layer-2 (L2) or Layer-3 (L3) provisioning, which may comprise setting network parameters such as L2/L3 parameters (e.g., VLANs and associated ports) and network attributes (e.g., VLAN encapsulation type, bandwidth allocations, QoS).

For purposes of this application, the terms "service instance" and "Ethernet service instance" are used synonymously. The use of these terms is not intended to limit the scope of the present invention. For purposes of this application, provisioning a network means configuring network elements/parameters and/or attributes of the network to provide a service. Provisioning a network may include configuring one or more network devices in the network to enable the network devices to provide the provisioned service. Examples of services that may be provisioned include but are not restricted to Internet service, cable service, audio service, video service, DSL service, network quality of service, packet routing and switching parameters based on layer 2, 3, or higher layers, and the like.

According to an embodiment of the present invention, an ESI object (or an ESI) may comprise one or more elements (also referred to as parameters) and one or more attributes. An element of an ESI may be a Layer 2 or Layer 3 (L2/L3) related parameter such as a parameter associated with a component of a network or a network device. An ESI may include one or more elements as its members. An ESI may thus represent a grouping of components of a network and/or a network device. Examples of L2/L3 parameters that can be elements of an ESI include but are not restricted to a Virtual Local Area Network (VLAN) and its associated port(s), a group of VLANs and their associated ports, a MAC address, an IP address, and/or other ESIs. For example, an ESI may be configured to include as its members one or more VLANs with their associated ports and/or one or more other ESIs. In one embodiment, an element of an ESI may be a grouping of up to 4096 VLAN elements and their associated ports representing a virtual switch, or a service parameter or another ESI.

For purposes of this application, including in the specification and the figures, when a VLAN is made a member of an ESI, it implies that the ESI element comprises information identifying the VLAN and its associated ports. Accordingly, all references to a VLAN being a member element of an ESI imply the VLAN and its associated ports are made member elements of the ESI. For example, the following {VLAN ID, associated ports} information may be used to specify an element of an ESI. For example, {VLAN 10, 1/1, 4/2, . . . } where 1/1, 4/2, etc. are ports associated with VLAN 10 (1/1 implies slot 1 port 1, 4/2 implies slot 4 port 2, etc.).

The attributes of an ESI identify properties of the ESI. Examples of attributes include but are not restricted to properties of network services that may be provisioned using the ESI such as quality of service (QoS), bandwidth allocation, encapsulation or VLAN tag type, priorities, policies, and others. For example, an ESI may comprise an attribute that specifies the encapsulation or type of a VLAN. Such an attribute may be referred to as an encapsulation attribute. Examples of VLAN types include a customer-VLAN (CVLAN), a service-VLAN (SVLAN), a B-component VLAN (BVLAN), an I-component service ID (ISID), and the like. In one embodiment, the VLAN type specified for the encapsulation attribute of an ESI determines the VLAN type for all VLANs that are elements of that ESI. In an alternative embodiment, a VLAN type may be specified in an ESI on a per-VLAN member basis.

With respect to types of VLANs, a CVLAN is a VLAN that is typically defined for network operations on the client or customer-side of a network. An SVLAN is typically used for provider networks which typically aggregate and transport CVLANs across a provider network, in addition to L2 network data transport within the provider network. An ISID is a 24-bit In-Service IDentifier which is typically used to define a service between endpoints across a provider backbone network. A BVLAN is a provider VLAN similar to an SVLAN, but is used typically for network connectivity in the provider core backbone. An embodiment of the present invention focuses on examples of VLAN allocation and operations using an ESI-based framework. However, this is not intended to limit the scope of embodiments of the invention as recited in the claims.

An ESI-based framework simplifies the task of provisioning networks. For example, use of ESIs simplifies the task of configuring network parameters for supporting a service (e.g., configuration of VLANs and associated ports). In one embodiment, using one or more ESIs, a network provider can create a virtual switching environment through a logical entity that would hold one or more VLANs and their port assignments.

Figure 2A:
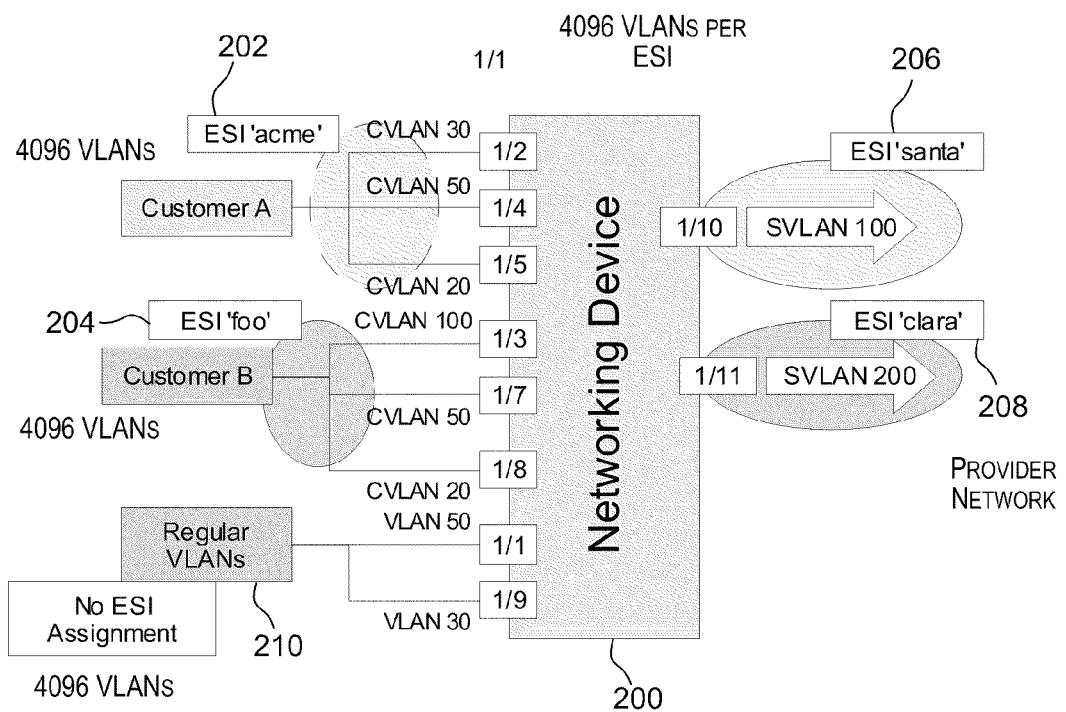
FIG. 2A depicts a simplified high-level Provider Bridged (IEEE802.1ad, also called PB) Network in which ESIs may be used to provision the network according to an embodiment of the present invention.

FIG. 2A depicts examples of ESIs that may be defined for a network device 200 according to an embodiment of the present invention. One or more ESIs may be configured for network device 200. In the example, depicted in FIG. 2A and described below, ESIs are configured for network device 200 for facilitating configuration of VLANs for network device 200. An ESI configured for network device 200 may comprise one or more elements (e.g., VLANs and their associated ports) and one or more attributes (such as network bandwidth allocations, encapsulation type, etc.) which apply to the elements (e.g., VLANs) of the ESI.

In one embodiment, two or more different ESIs configured for a system such as network device 200 may hold the same VLAN value but are bound to separate ports of network device 200, with each VLAN and its associated ports clearly identifiable by the ESI to which it belongs. Accordingly, each ESI can have its own set of VLAN values. As a result, each ESI configured for a network device can have the entire range of 4096 VLANs. Since each ESI may hold up to 4096 VLANs and multiple such ESIs may be configured for a network device, the number of VLANs configured for a network device can exceed 4096 VLANs. In addition to VLANs configured using ESIs, an additional up to 4096 regular VLANs (i.e., VLANs not associated with any ESI) may be configured for the network device. In this manner, the ESI-based framework enables a network device to conveniently support more that 4096 ESIs. Further, where two VLANs have the same value, the VLANs are clearly distinguishable using the respective ESIs used to define the VLANs. This is different from conventional techniques according to which a network device was restricted to having only 4096 VLANs defined for the network device.

The following example describes how ESIs may be used to configured VLANs for network device 200 depicted in FIG. 2A. As depicted in FIG. 2A, services are provided for two customers A and B. As depicted in FIG. 2A, on the customer side, two ESIs named "acme" 202 and "foo" 204 are created for defining VLANs for the client side and two ESIs "santa" 206 and "clara" 208 are created for configuring VLANs for the provider side. In addition to VLANs configured using ESIs "acme," "foo," "santa," and "clara," a set of up to 4096 regular VLANs 210 may be configured for network device 200.

In the example depicted in FIG. 2A, ESI acme 202 defines three VLANs as its member elements: CVLAN 30 associated with port 1/2, CVLAN 50 associated with port 1/4, and CVLAN 20 associated with port 1/5. The encapsulation attribute for ESI acme may be set to "CVLAN" to indicate that all the CVLAN members of the ESI are of type CVLAN. ESI foo 204 also defines three VLANs as its member elements: CVLAN 100 associated with port 1/3, CVLAN 50 associated with port 1/7, and CVLAN 20 associated with port 1/8. The encapsulation attribute for ESI foo may also be set to "CVLAN" to indicate that all the CVLAN members of the ESI are of type CVLAN.

It is to be noted in the embodiment depicted in FIG. 2A that both ESI acme 202 (defined for Customer A) and ESI foo 204 (defined for Customer B) comprise a VLAN with the same value, namely VLAN 50 associated with different ports of the network device. In this manner, VLANs with the same value may be defined for the same network device using different ESIs, thereby enabling each ESI to support up to 4096 VLANs and more than 4096 VLANs to be configured for the network device.

ESI santa 206 defines an SVLAN 100 associated with port 1/10. The encapsulation attribute of ESI santa 206 may be set to "SVLAN" to indicate the type of its VLAN member elements. As will be explained below in more detail, ESI acme is also defined as a member of ESI santa, thereby defining a hierarchical relationship between ESI santa and ESI acme. This hierarchical relationship represents the hierarchical mapping of the CVLANs 30, 50, and 20 defined by ESI acme to SVLAN 100 over the provider network. The hierarchical relationships are used to provision a network and also influence network encapsulations as a packet is forwarded from a client VLAN to a provide VLAN by network device 200.

ESI clara 208 defines an SVLAN 200 associated with port 1/11. The encapsulation attribute of ESI clara 208 may be set to "SVLAN" to indicate the type of its VLAN member elements. ESI foo is also defined as a member of ESI clara, thereby defining a hierarchical relationship between ESI clara and ESI foo. This hierarchical relationship represents the hierarchical mapping of the CVLANs 100, 50, and 20 defined by ESI foo to SVLAN 200 over the provider network.

As indicated above, in addition to VLANs configured using ESIs a set of up to 4096 additional regular VLANs may be configured for a network device. In the embodiment depicted in FIG. 2A, two regular VLANs have been configured for network device 200, namely, VLAN 50 associated with port 1/1 of network device 200 and VLAN 30 associated with port 1/9 of network device 200.

As previously indicated, an ESI may define zero or more other ESIs as its member elements. This establishes a hierarchical relationship between the ESIs. When a first ESI includes or comprises a second ESI as its member element, it indicates that the second ESI is linked to or associated with the first ESI and creates a hierarchical relationship between the two ESIs. The first ESI is sometimes referred to as a provider or parent ESI and the second ESI is referred to as a client or child ESI. A child ESI may in turn include zero or more ESIs as its member elements and so on. In this manner, a hierarchical relationship may be created between a set of ESIs including parent ESIs and child ESIs.

A hierarchical relationship between ESIs may be created and configured to represent various hierarchical aspects of a network environment. For example, in the embodiment depicted in FIG. 2A, network device 200 provides a boundary device between client networks and a provider network. Multiple CVLANs of a client may be aggregated and carried over an SVLAN over the provider network. Accordingly, there is a hierarchical relationship between the CVLANs and the SVLANs. For example, CVLAN 30 on port 1/2, CVLAN 50 on port 1/4, and CVLAN 20 on 1/5 may be aggregated and carried over SVLAN 100. This hierarchical relationship between the CVLANs and the SVLAN may be represented by creating a hierarchical relationship between an ESI defining the CVLANs and an ESI representing the SVLAN. For example, ESI acme is configured to define CVLAN 30 on port 1/2, CVLAN 50 on port 1/4, and CVLAN 20 on 1/5, while ESI santa is used to define SVLAN 100. ESI acme is then made a child of SVLAN 100. The hierarchical relationship between ESIs acme and santa thus represents the hierarchical relationship between the CVLANs and the SVLAN. Similarly, a hierarchical relationship may be created between ESI foo and ESI clara where ESI foo is made a child of ESI clara. This hierarchical relationship between ESIs foo and clara represents the hierarchical relationships between the VLANs defined by ESI foo and the VLANs defined by ESI clara. In this manner, hierarchical relationships between ESIs may be used to represent hierarchical relationships between various components of a network or network device.

The creation of a hierarchical relationship between a parent ESI and a child ESI has several effects. In the hierarchical relationship, the child ESI inherits all the attributes of the parent ESI. Inheritance implies that all the attributes of the parent ESI and their associated values are also applicable to the child ESI. One or more of the attributes and their values inherited by a child ESI from a parent ESI may be overridden by the child ESI. For example, if an attribute A1 is defined for a parent ESI and associated with a value V1, then a child ESI of the parent ESI will inherit the attribute A1 and its associated value V1. Further, if desired, a different value V2 may be associated with A1 locally in the child ESI that overrides the inherited value V1. A child ESI may also specify additional attributes and associated values in addition to those defined by the parent ESI.

In one embodiment, the creation of a hierarchical relationship between a parent ESI and a child ESI creates a binding between the parent and child ESIs that is used for network level encapsulations. For example, the hierarchical relationship determines the processing performed on a packet by the network device where the hierarchical relationship is defined. In one embodiment, a network device may make changes to a received packet based upon the ESIs defined for the network device and the hierarchical relationships between the ESIs. For example, in a carrier or provider network (e.g., an AT&T network), usually an incoming customer VLAN packet is encapsulated with successive encapsulations such as with service VLANs, in-service identifiers, or backbone VLANs. According to an embodiment of the present invention, each of these encapsulations may be associated with a different ESI. To define the encapsulation hierarchy, an ESI for the incoming packet may be defined to be a child of the ESI for the next encapsulation. In this manner, a hierarchical relationship may be created to represent the hierarchy where the child ESI represents the customer encapsulation and the parent represents the provider encapsulation.

The ability to create parent-child relationships between ESIs enables a hierarchy of ESIs to be created. When a user provisions an ESI to be a child (or client) ESI of a parent (or provider) ESI, configuration for the child ESI is done prior to configuration for the parent ESI. In a hierarchy of ESIs, if a parent ESI includes a child ESI as a member which in turn includes another child ESI, then the configuration and definition for the another child ESI is done first, followed by definition and configuration for the child ESI, and then followed by the definition and configuration for the parent ESI.

Figure 2B:
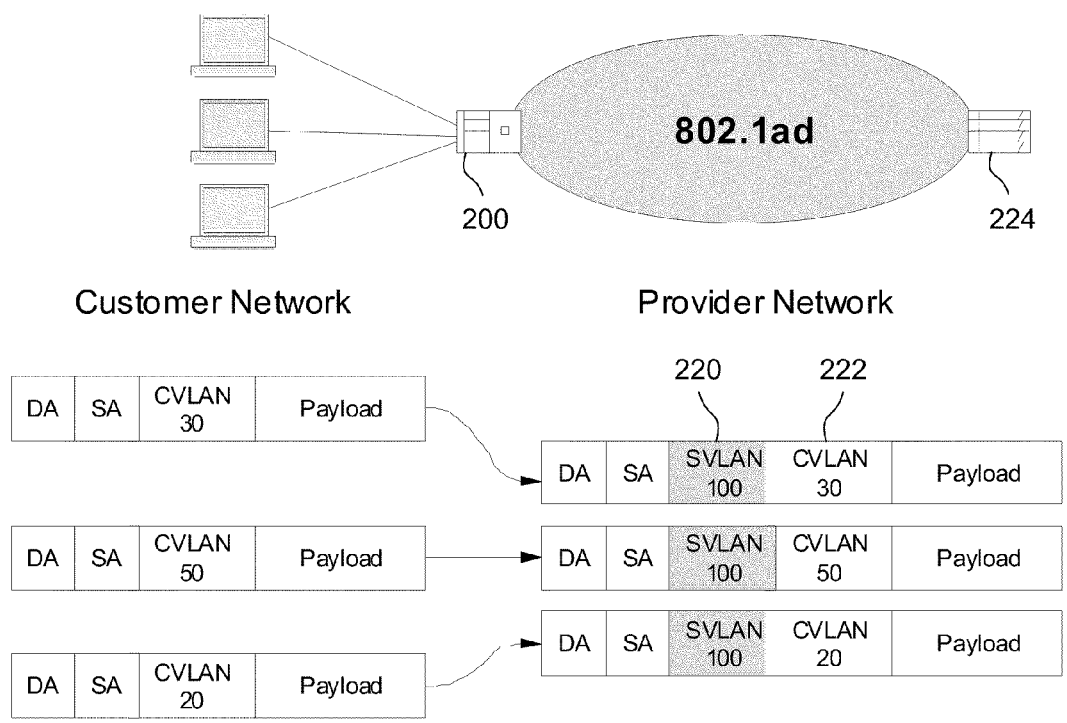
FIG. 2B depicts encapsulations that are added to a packet as a packet enters a provider network from a customer side based upon ESIs defined for the network configuration according to an embodiment of the present invention.

Accordingly, a network device such as network device 200 depicted in FIG. 2A may use the ESI information to provide packet encapsulations at each stage. For example, FIG. 2B depicts encapsulations that are added to a packet as a packet enters a provider network from a customer side based upon ESIs defined for a network device 200 that is located at the boundary between the customer network and a provider network. As depicted in FIG. 2A, ESI "acme" defined for customer A comprises VLANs 30, 50, and 20, and it is a child of ESI "santa" which contains attributes for a provider network comprising SVLAN 100. Attributes of ESI "santa" include VLAN tag type value for SVLAN, and ESI "acme" includes VLAN tag type for CVLAN. A packet received by network device 200 from a client CVLAN comprises a tag identifying the client CVLAN. For example, a packet from CVLAN 30 of Customer A may comprise a tag CVLAN 30. When the packet reaches network device 200 and before it is forwarded to the provider network via SVLAN 100, network device 200 inserts encapsulations for SVLAN 100. This is done using the hierarchical relationship created between ESIs acme (defining CVLAN 30) and santa (representing SVLAN 100) where ESI acme is a child of ESI santa. As part of the processing performed as a result of the hierarchical relationship, a VLAN tag 220 is added for SVLAN 100 to the packet in addition to tag 222. Thus, all packets from VLANS defined by ESI "acme" are transported to the provider network using SVLAN encapsulation defined for ESI "santa". For example, for a packet travelling from CVLAN 30 (Customer A) to SVLAN 100, when the packet enters the provider network the packet has tags for CVLAN 30 and SVLAN 100. For a packet travelling from CVLAN 50 (Customer A) to SVLAN 100, when the packet enters the provider network the packet has tags for CVLAN 50 and SVLAN 100. For a packet travelling from CVLAN 20 (Customer A) to SVLAN 100, when the packet enters the provider network the packet has tags for CVLAN 20 and SVLAN 100.

Another network device 224 may lie at the boundary of the provider network and a customer network. The ESIs configured for the network device and the hierarchical relationships between the ESIs are again used to perform network encapsulations on packets received by network device 224 via an SVLAN over the provider network before the packets are forwarded over a customer network. In this situation, network device 224 may remove an SVLAN tag from the packet. For example, network device 224 may remove tag 220 prior to forwarding the packets over the customer network. In this manner, the hierarchical relationships established between ESIs are used to influence packet processing including performing packet-level changes.

As described above, an ESI may include other ESIs as its member elements. However, it is not required that an ESI include another ESI as its member element. An ESI that does not include any other ESI and is not included as a child of any other ESI is referred to as a standalone ESI. A standalone ESI may include as its members other components of a network and/or a network device such as one or more VLANs and their associated ports.

Accordingly, classifications of ESIs include:
(1) Standalone ESI—An ESI that is not linked or associated with any other ESI. A standalone ESI does not include any child ESIs and is also not included by any other ESI. Such an ESI may be used for holding one or more VLANs and for defining their properties.
(2) Parent ESI—An ESI that holds or comprises one or more other ESIs as its elements. The included ESIs are called child ESIs. For example, a parent ESI may have one or more VLANs and one or more child ESIs as its member elements. A child ESI may also have one or more VLANs and/or other ESI as its member elements.
(3) Child (or client) ESI—An ESI that is a member of another ESI.

Various data structures may be used for implementing and storing information related to ESIs and for providing the ability to do network provisioning using ESIs. These data structures may be stored in the memory of a network device providing ESI capability. A new data structure may be created and stored for each new ESI. In one embodiment, a data structure for an ESI may have the following fields:
(1) ESI name—This name acts as an identifier uniquely identifying the ESI in a network system. The name may be an ASCII string.
(2) VLAN list—This field identifies a list of zero or more VLANs and their associated ports that are member elements of the ESI. In one embodiment, VLAN list may be a pointer pointing to a list of nodes, each node representing a VLAN member element storing information identifying the VLAN and port(s) associated with the VLAN. In one embodiment, a VLAN ID is used to identify each VLAN. A VLAN ID may comprise: (a) 24 bits of VLAN tag (12 bits for CVLAN, SVLAN, and BVLAN, or 24 bits of ISID); (b) one bit for identifying if the VLAN is a regular VLAN; (c) one bit for identifying if the VLAN is an ISID; and (d) 14 bits for VLAN mask for the VLAN. The VLAN list pointer may be set to null when there are no VLAN members.
(3) Parent (provider) ESI—This field for an ESI identifies a parent ESI, if any, of the ESI. In one embodiment, this field comprises a pointer that points to the parent ESI. This pointer may be set to null when there is no parent ESI for the ESI.
(4) Child (or client) ESI list—This field identifies a list of ESIs, if any, that are included as member elements of the ESI. In one embodiment, this field is a pointer pointing to a list of child ESIs. This pointer may be set to null when there are no member child ESIs.
(5) Attributes—This is a set of fields that stores attributes for the ESI. For example, one of the fields may specify an encapsulation attribute that identifies a type of VLAN. The VLAN type specified by the encapsulation attribute is applicable to all the VLANs that are members of the ESI (i.e., to all the VLANs identified by the VLAN list).

It should be apparent that more or less fields than those described above may be provided in alternative embodiments.

In one embodiment, separate data structures may be provided for storing information related to VLANs and their associated ports. For example, information for VLANs and their associated ports may be stored in a linked list of VLAN data structures, with each element in the linked list storing information for a VLAN and its associated ports. For a VLAN that is a member element of an ESI, the VLAN list field of the ESI may point to a data structure storing information for that VLAN and its associated ports. This way, multiple VLAN entries with associated ports information of the same VLAN tag type may be created and associated with different ESIs with no conflicts.

Figure 3A:
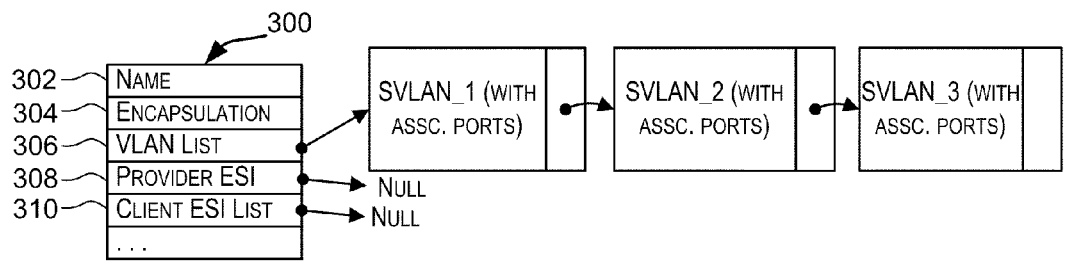
FIGS. 3A and 3B depict examples of data structures that may be used for storing information related to ESIs according to an embodiment of the present invention.
Figure 3B:
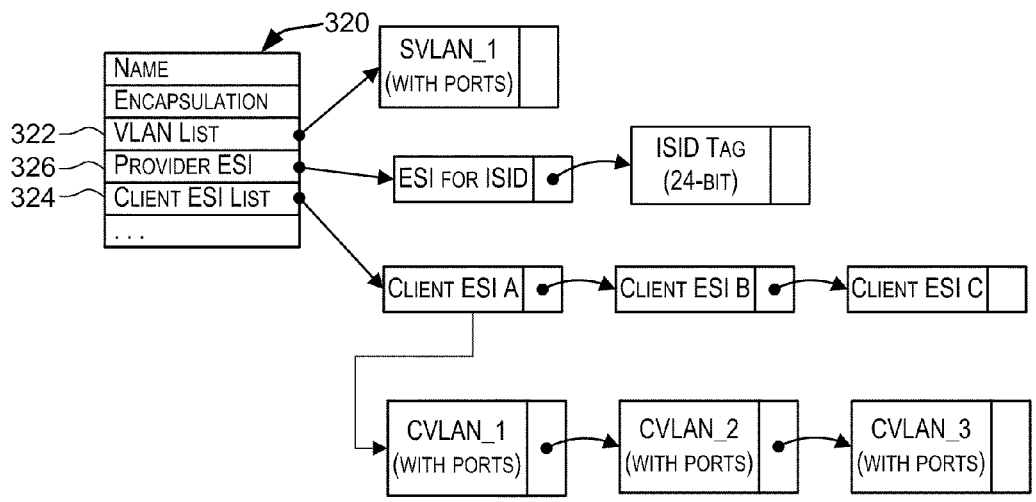

FIGS. 3A and 3B depict examples of data structures that may be used for storing information related to ESIs according to an embodiment of the present invention. FIG. 3A depicts a memory structure 300 for a standalone ESI that has three SVLANs and their associated ports defined as member elements. The fields of ESI 300 include a name 302, an attributes field 304 (an encapsulation attribute is shown), a VLAN list 306, a provider ESI field 308, and a client ESI list 310. As depicted in FIG. 3A, VLAN list 306 of ESI 300 points to a list of VLANs that are member elements of ESI 300. This list points to data structures for SVLAN_1, SVLAN_2, and SVLAN_3 and their associated ports. Client ESI list field 304 is null indicating that there are no child ESIs defined for ESI 300. The parent ESI field 308 is also null indicating that ESI 300 is not included or associated with any other ESI.

FIG. 3B depicts an example of a memory structure 320 for an ESI representing an SVLAN that has both an SVLAN and other ESIs as its elements. As depicted in FIG. 3B, ESI 320 has as its member element an SVLAN (with its associated ports) pointed to by VLAN list field 322 (encapsulation attribute of the ESI is set to SVLAN). ESI 320 also has three ESIs (namely, Client ESI A, Client ESI B, and Client ESI C) as its members pointed to by child ESI list field 324. The child ESIs may have their own members and attributes. For example, Client ESI A has three CVLANs as its members. Likewise, other client ESIs may have VLAN or other ESIs as members. As depicted in FIG. 3B, ESI 320 has a provider ESI pointed to by provider ESI field 326 of encapsulation type ISID (MAC-in-MAC) with an ISID tag entry. Given a structure as depicted in FIG. 3B, software/hardware supporting ESI capability can determine the hierarchical relationship represented by the structure and apply successive encapsulation values to be put in a given packet and perform appropriate packet processing.

Figure 4:
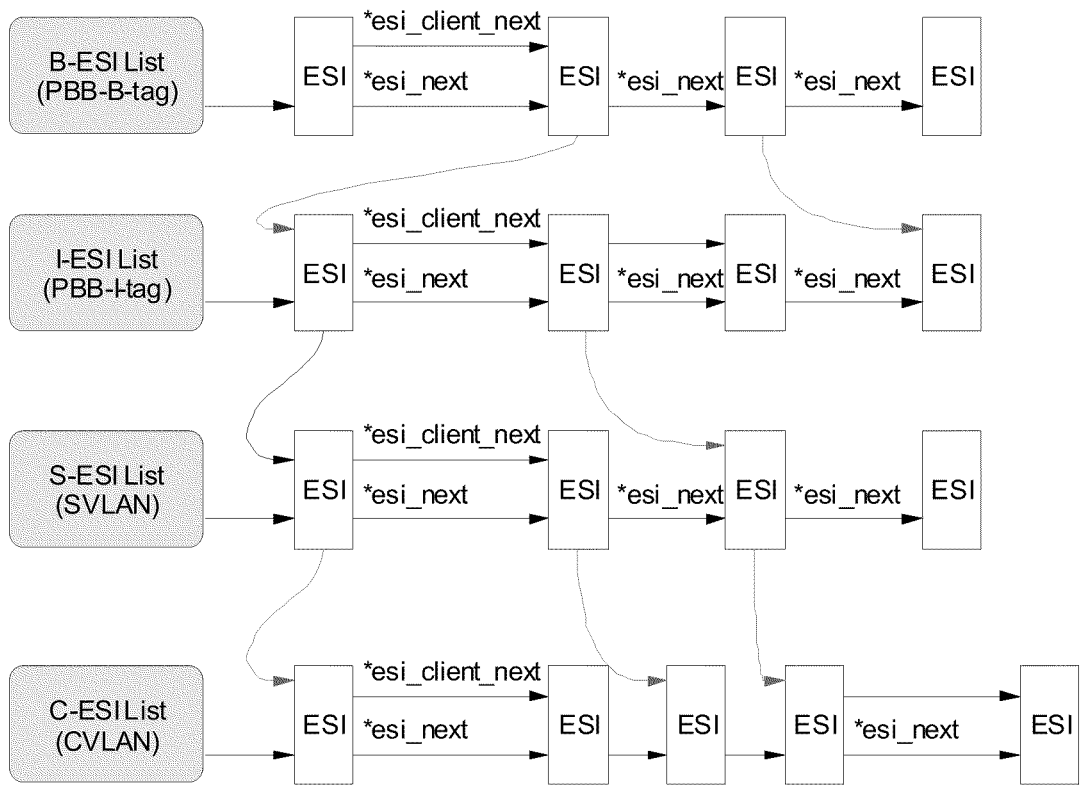
FIG. 4 depicts lists of ESIs that may be maintained based upon the encapsulation attribute value of the ESIs according to an embodiment of the present invention.

In one embodiment, in order to support both 802.1ad and 802.1ah, the software on a network device may maintain a database of ESI structures and also maintain lists of ESIs based upon the encapsulation attribute values of the ESIs. As previously described, in one embodiment, the encapsulation attribute value may specify a CVLAN, an SVLAN, a BVLAN, or an ISID. In such an embodiment, four separate lists of ESI objects may be maintained corresponding to the four categories of VLANs that are indexed by the encapsulation type. FIG. 4 depicts four such lists according to an embodiment of the present invention.

As depicted in FIG. 4, depending on its encapsulation attribute type, a given ESI belongs to one of the four lists. When the encapsulation attribute for an ESI is changed, the ESI is moved to the appropriate list. For example, when encapsulation of an ESI is changed to SVLAN, the ESI object is added to S-ESI list and connected to other ESIs in the list using an esi_next pointer. As CVLAN ESIs (C-ESI) are added as elements to an S-ESI, the C-ESI elements are added to a client list inside the S-ESI and the different C-ESI elements bound to this S-ESI are interconnected.

Figure 5:
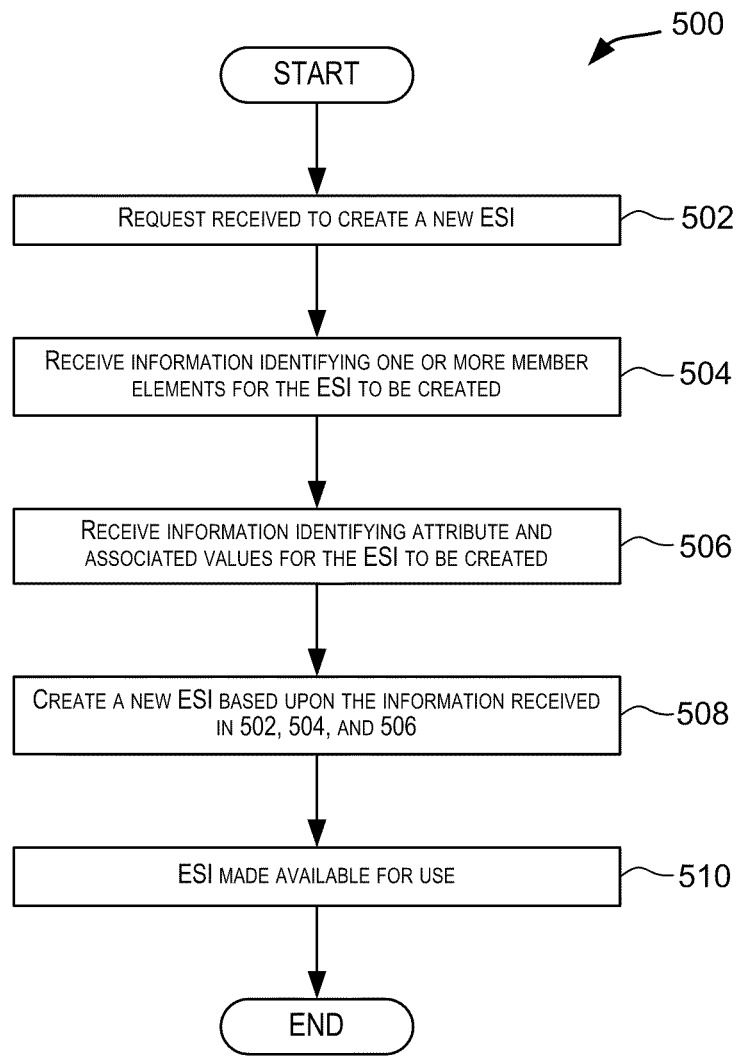
FIG. 5 is a simplified flowchart depicting a method for creating an ESI according to an embodiment of the present invention.

FIG. 5 is a simplified flowchart 500 depicting a method for creating an ESI according to an embodiment of the present invention. The method depicted in FIG. 5 may be performed by hardware, software (e.g., code, program, instructions executed by a processor), or combinations thereof. The software may be stored on a computer-readable storage medium. In one embodiment, the method in FIG. 5 is performed by a network device such as a router, a switch, etc.

As depicted in FIG. 5, a request is received for creating a new ESI (step 502). As part of 502, information may be received indicating a name to be used for identifying the ESI to be created. The name may be specified as an ASCII string. The request may be initiated by a network administrator or other user, as part of system configuration.

Information is then received identifying one or more member elements for the new ESI to be created (step 504). The members may be L2/L3 parameters identifying components of a network or network device. For example, as part of 504, information may be received identifying one or more VLANs and associated to be made member elements of the ESI being created. A group of VLANs and associated ports may also be specified. If a hierarchical relationship is to be created, the information received in 504 may identify one or more child ESIs to be made members of the new ESI to be created. The child ESIs may be identified using their names.

Information may be received identifying attributes and their values for the ESI to be created (step 506). For example, as part of 506, information may be received specifying a VLAN type to be associated with an encapsulation attribute of the ESI being created.

A new ESI is then created based upon the information received in 502, 504, and 506 (step 508). As part of 508, one or more memory structures may be created for storing information for the ESI. Fields of the newly created memory structures may be updated based upon the members and attributes information received in 504 and 506. For example, the VLAN list field of the newly created ESI may be made to point to a list comprising data structures corresponding to the VLANs to be made members of the ESI. The child ESI list field of the ESI may be updated to point to a list of child ESIs. The parent ESI field of the ESI may also be updated and is set to null (since this ESI being created is not yet a child of any other ESI). The ESI created in 508 is then made available to be used for network provisioning (step 510).

In one embodiment, a free pool of memory buffers or blocks may be stored by a network device for allocation to ESIs. A hash table may be maintained with each entry in the hash table pointing to a block or a list of blocks. As part of 508, the name (i.e., ESI identifier) received in 502 may be used to create an integer value that is used as a hash-index to an entry in the hash table. The hash table entry may provide a pointer pointing to a free block that is then allocated to the ESI being created. The name field of the block is set to the name received in 502. The VLAN list pointer is set to point to the list of VLANs specified in 504. In one embodiment, the memory structures for the VLANs may have been previously configured. The attribute fields of the block are then set to the attribute values received in 506. Since the ESI is newly created, it does not yet have any parent ESI, and accordingly the parent ESI field of the block may be set to null.

Different tools and interfaces may be provided for creating and configuring ESIs. In one embodiment, ESIs may be created using command-line instructions (CLIs). For example, the following command-line syntax may be used to create an ESI:

(config)#     esi<esi-name>encapsulation<cvlan|svlan|isid|bvlan> where

<esi-name> is the name for the ESI

<cvlan|svlan|isid|bvlan> indicates the encapsulation type of VLAN for the ESI.

In one embodiment, the value for the "encapsulation" attribute can be one of: "cvlan" to specify the encapsulated Customer VLAN (CVLAN), "svlan" to specify the encapsulated Service VLAN (SVLAN), "isid" to specify the encapsulated mapping of different SVLANs into service identifiers, and "bvlan" to specify the encapsulated Backbone VLAN (BVLAN). Tag type values are defined for support of IEEE 802.1ad (provider Bridging) and IEEE 802.1ah (Provider Backbone Bridging). CVLAN and SVLAN refer to encapsulations for IEEE 802.1ad and ISID and BVLAN refer to encapsulations for IEEE 802.1ah.

Once an ESI is created, subsequent invocations of the ESI may not require encapsulation attributes.

The following provides an example of creating an ESI using CLIs:

(1) An ESI named "acme" with CVLAN tagging may be created using the command:

>>(config)# esi acme encapsulation cvlan (2) A CVLAN (VLAN 10) may be defined as a member element of ESI acme using the command >>(config-esi-acme)# vlan 10

(3) CVLAN 10 may be associated with port 1/1 using command

>>(config-esi-acme-vlan-10)# tagged Ethernet 1/1

(4) Information related to ESIs that have been configured may be displayed using command >>(config)#show esi As described above, one or more VLANs may be made members of an ESI. In one embodiment, a VLAN group may be created and added as a member of an ESI. VLAN groups may be configured either for regular or customer ESIs (any encapsulation).

vlan-group 6—Create a VLAN group add-vlan esi abc 100 to 110—Add VLANs to the VLAN group

The following CLIs may be used to add a VLAN group to an ESI.

esi abc encapsulation cvlan—ESI abc created with encapsulation set to CVLAN
vlan-group 6
add-vlan 100 to 110—defines VLANs included in the VLAN group
This command adds VLANs 100 to 110 to ESI abc of CVLAN encapsulation type.
VLAN group operations may be performed across ESIs. For example,
vlan-group 6
add-vlan esi abc 100 to 110
add-vlan esi def 120 to 140
These commands add VLANs 100 to 110 to ESI "abc" and VLANs 120 to 140 to ESI "def".

Figure 6:
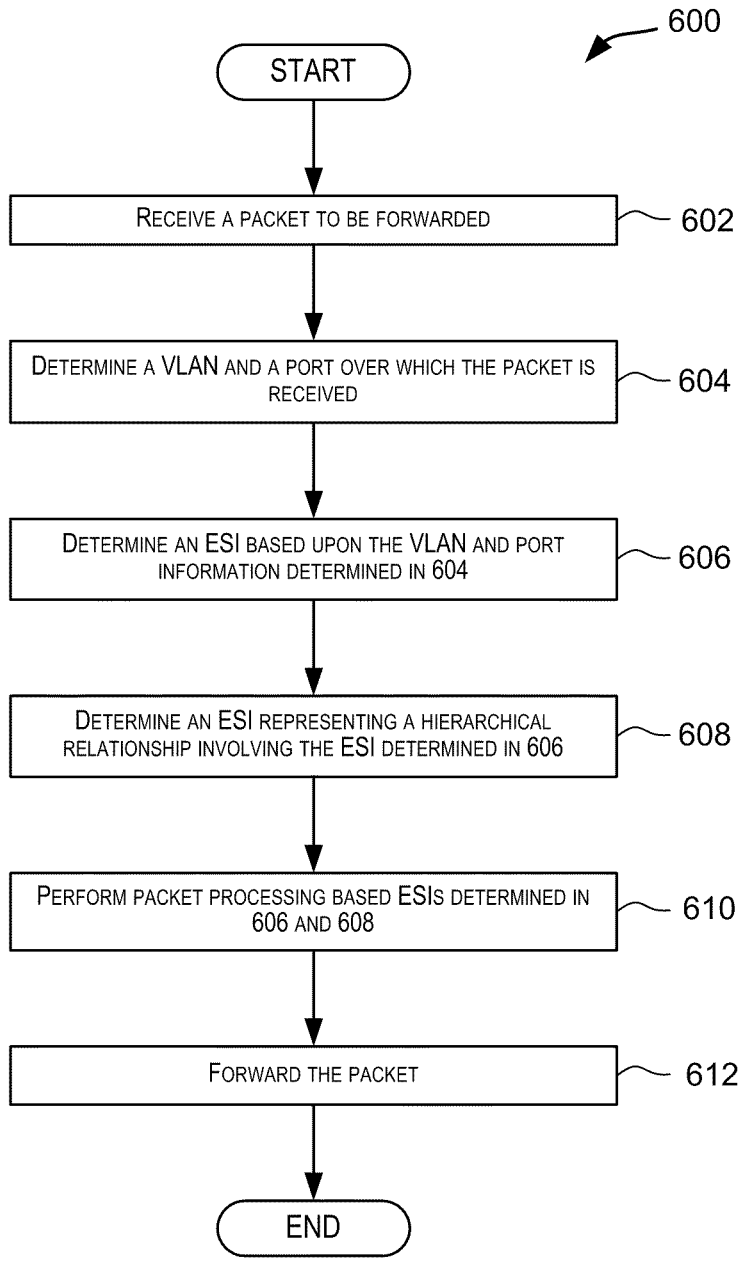
FIG. 6 is a simplified flowchart depicting a method for processing performed by a network device based upon ESIs configured for the network device according to an embodiment of the present invention.

FIG. 6 is a simplified flowchart 600 depicting a method for processing performed by a network device based upon ESIs configured for the network device according to an embodiment of the present invention. The method depicted in FIG. 6 may be performed by hardware, software (e.g., code, program, instructions executed by a processor), or combinations thereof. The software may be stored on a computer-readable storage medium. In one embodiment, the method in FIG. 6 is performed by a network device such as a router, a switch, etc.

As depicted in FIG. 6, processing may be initiated when a network device receives a packet that is to be forwarded (step 602). A VLAN and a port of the network device over which the packet is received is determined (step 604). Based upon the information determined in 604, an ESI configured for the network device and which is to be used for processing the packet is determined (step 606). In one embodiment, from the ESIs configured for the network device, an ESI which has the VLAN and associated port determined in 604 as a member element is selected. If multiple such ESIs exist, then other packet-related criteria may be used to determine the closest match ESI from the multiple ESIs. This other criteria may include a priority associated with the packet, the source or destination address of the packet, and the like.

A determination is then made whether the ESI determined in 606 is involved in a hierarchical relationship with another ESI, and such an ESI is determined (step 608). In one embodiment, the processing in 608 may involve determining if the ESI selected in 606 is a member element of a parent ESI. Such a parent ESI is identified in 608.

The packet is processed according to the ESIs determined in 606 and 608 (step 610). The processing performed in 610 may include performing network encapsulations on the packet if the selected ESI has a hierarchical relationship with other ESIs. This may include modifying the packet, such as by adding or removing tags from the packet. For example, if a network device at a boundary between a customer network and a provider network receives a packet from the customer network to be forwarded to the provider network, then an SVLAN tag may be added to the packet. For example, if a packet is received over CVLAN 30 associated with port 1/2, then ESI acme may be selected in 606, ESI santa may be selected in 608, and an SVLAN 100 tag may be added to the packet in 610. On the other hand, if the network device receives the packet over the provider network and the packet is to be forwarded to the customer network, then an SVLAN tag may be removed from the packet. An example of this has been described above with respect to FIG. 2B. After the appropriate packet processing, the packet may be forwarded (step 612).

In the manner described above, the packet may be processed based upon the selected ESI. The selected ESI may identify a hierarchical relationship, which then affects how the packet is processed Applications of ESIs There are different ways in which ESIs may be used to provision a single and/or multistage network. For example, a hierarchy of ESIs may be configured using a client-provider relationship to provide a service. Such a chain of ESIs, connected by rules of interconnection, may provide a complete view of the network and help a network operator design the network without manually interconnecting every port pair. An ESI may be used for configuring network parameters such as encapsulations, port bindings, bandwidth allocations, and any other network properties. The following section describes various applications of ESIs in provisioning networks. These examples are however not intended to limit the scope of the invention embodiments recited in the claims.

Figure 7:
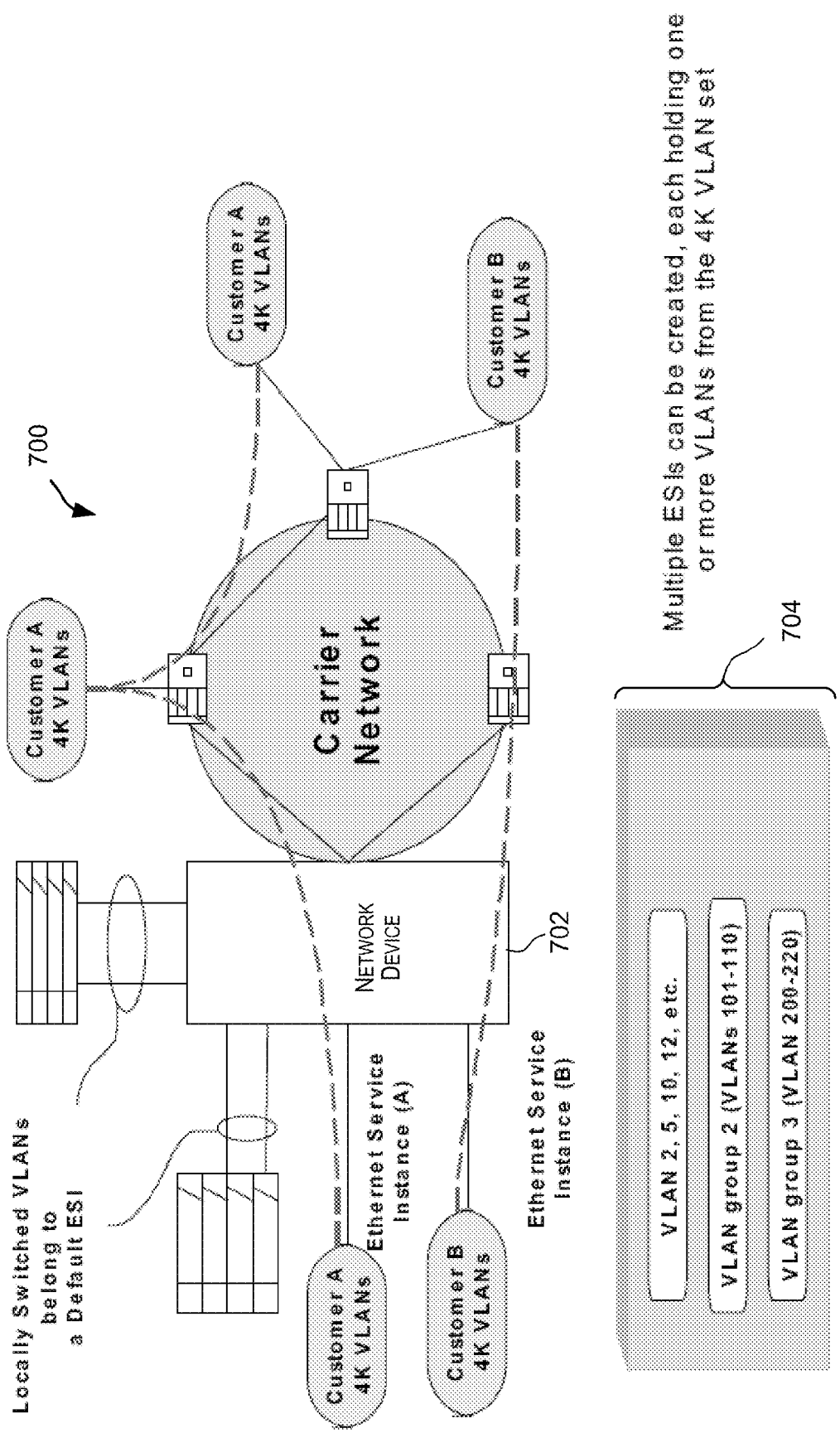
FIG. 7 is a simplified high level block diagram of a network environment in which ESIs may be used to provision the network according to an embodiment of the present invention.

The concept of ESIs may be used by a carrier to create sets of ESIs that hold one or more of the VLANs from the 4K (i.e., 4096) VLAN set. FIG. 7 is a simplified high level block diagram of a network environment 700 in which ESIs may be used to provision the network according to an embodiment of the present invention. As depicted in FIG. 7, customers A and B are connected to a network device 702, with each customer having a separate set of VLANs. Network device 702 may be a switch or router such as a switch or router provided by Brocade Communications Systems, Inc. A device such as network device 702 may provide IP routing and advanced Carrier Ethernet capabilities, including Provider Backbone Bridging (PBB), in a compact form factor and offer deep buffers and are ideal for delivering Carrier Ethernet services at the network edge and for data center top-of-rack server access.

A carrier can create multiple ESIs 704, each holding one or more VLANs. Each ESI is identified by a name that is locally unique. Each ESI provides a container for storing Layer-2 and Layer-3 parameters (such as VLANs and associated ports) and attributes or properties of the elements contained in the ESI. A carrier can provision one or more of the ESIs per customer. Once an ESI has been created, network device 702 operates on rules for configuring VLANs inside an ESI and checks against configuration incompatibilities within the system (such as configuring the same VLAN value from two different ESIs on the same port).

Provisioning Provider Bridge (PB) Networks

In one embodiment, ESIs may be used to provision IEEE 802.1ad Provider Bridge (PB) networks. In a Provider's Bridge (PB) Network, a provider VLAN is called a Service VLAN (SVLAN), and a customer VLAN is called a Customer VLAN (CVLAN). One or more CVLANs (up to 4K CVLANs) may be mapped to an SVLAN, therefore allowing a customer VLAN to cross a provider boundary. The SVLAN may be provisioned to provide service, tunnels and/or broadcast domains based on the provider's configuration. For a packet communicated from one Customer A site to another Customer A site over a provider network, the packet comprises information identifying the two types of VLANs (i.e., the CVLAN and the SVLAN) so that the customer packet with its VLAN information is carried to the customer network on the other side. A Provider Edge (PE) device (i.e., such as network device 702 on the edge of a PB network) receives packets from Customer A with no tags or packets with a CVLAN tag and adds an SVLAN field to the packets before sending into the Provider Network. At an inter-provider boundary, the network device can perform SVLAN translation if configured. In a PB network, an SVLAN can take a value between 1-4090 (an SVLAN limit of 4K VLANs is typically inadequate in the carrier space) and every PB node has to learn all customer MAC addresses, like any normal VLAN device, even with SVLAN encapsulation.

FIGS. 2A and 2B and the associated description above describes how ESIs may be used to provision a simplified high-level Provider Bridged (IEEE802.1ad) Network according to an embodiment of the present invention. The ESI-based framework is used for provisioning connectivity between the various CVLANs and the SVLANs.

Figure 8:
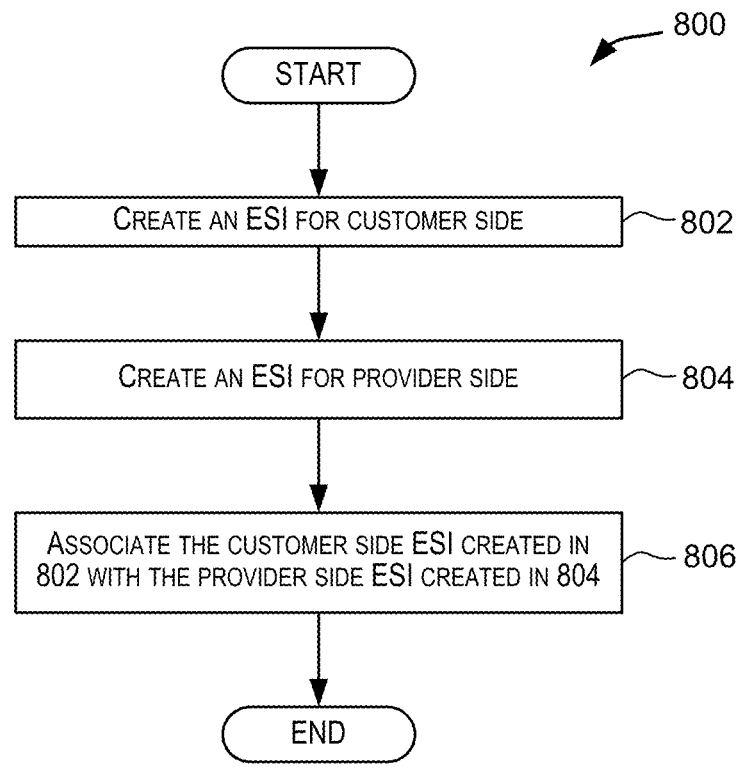
FIG. 8 is a simplified flowchart depicting a method for using ESIs to provision a PB network according to an embodiment of the present invention.

FIG. 8 is a simplified flowchart 800 depicting a method for using ESIs to provision a PB network according to an embodiment of the present invention. The method depicted in FIG. 8 may be performed by hardware, software (e.g., code, program, instructions executed by a processor), or combinations thereof The software may be stored on a computer-readable storage medium. In one embodiment, the method in FIG. 8 may be performed by a network device such as network device 200 depicted in FIG. 2A.

An ESI is created for the customer side (step 802). The customer side is outside of a provider network and faces the provider network. For example, for the network depicted in FIG. 2A, the ESIs created for the customer side include ESI "acme" for customer A and ESI "foo" for customer B. In one embodiment, the following command may be used to create, for example, ESI "acme"
(config)# esi acme encapsulation cvlan As shown above, the encapsulation of the customer side ESI is set to CVLAN.

As part of 802, CVLAN members of the ESI are defined. For example, CVLANs 30, 50, and 20 depicted in FIG. 2A may be made members of ESI "acme". In one embodiment, the following commands may be used to add the CVLANs to ESI "acme".
(config-esi-acme)# vlan 30—adds VLAN 30
(config-esi-acme-vlan-30)# tagged ethernet 1/2—Associated ports information. CVLAN 30 becomes tagged on port 1/2
(config-esi-acme)# vlan 50—adds VLAN 50
(config-esi-acme-vlan-50)# tagged Ethernet 1/4—Associated ports information. CVLAN 50 becomes tagged on port 1/4
(config-esi-acme)# vlan 20—adds VLAN 20
(config-esi-acme-vlan-20)# tagged Ethernet 1/5—Associated ports information.
CVLAN 20 becomes tagged on port 1/5
(config-esi-acme-vlan-20)# exit Customer side ESI "foo" for customer B (see FIG. 2A) may also be created in a similar manner and CVLANs 100 (tagged on port 1/3), 50 (tagged on port 1/7), and 20 (tagged on port 1/8) may be added as members. In this manner, ESIs are created for the customer side.

An ESI is created for the provider side (step 804). A provider may be a carrier such as AT&T. For example, for the network depicted in FIG. 2A, ESIs "santa" and "clara" are created for the provider IEEE 802.1ad service. In one embodiment, the following commands may be used to create a provider side ESI such as ESI "santa".
(config)# esi santa encapsulation svlan As shown above, the encapsulation attribute of ESI "santa" is set to SVLAN.

As part of 804, SVLAN members of the ESI are defined. For example, for the configuration depicted in FIG. 2A, SVLAN 100 on port 1/10 is made a member of ESI "santa" and SVLAN 200 on port 1/11 is made a member of ESI "clara". In one embodiment, the following commands may be used to add an SVLAN to ESI "santa".
(config-esi-santa)# vlan 100
(config-esi-santa-vlan-100)# tagged ethernet 1/10—associates physical port(s) with the VLAN ESI "clara" (see FIG. 2A) may also be created in a similar manner and SVLAN 200 (tagged on port 1/11) added as a member. In this manner, ESIs are created for the provider side.

Hierarchical relationships are then created between the customer ESIs and the provider ESIs representing the network hierarchies (step 806). In the example of FIG. 2A, ESI "acme" is made a child element of ESI "santa" and ESI "foo" is made a child element of ESI "clara". In one embodiment, the following commands may be used to perform the associations:
(config)# esi santa
(config-esi-santa)# esi-client acme
(config-esi-santa)# exit
(config)# esi clara
(config-esi-clara)# esi-client foo
(config-esi-clara)# exit As a result of 806, the ESIs configured for the embodiment depicted in FIG. 2A are as shown in Table A:

TABLE A

| ESI Name | Encap | # Members | Provider ESI | Provider Encap | Provider VLAN | Client ESIs |
|---|---|---|---|---|---|---|
| acme | cvlan | 3 | santa | svlan | 100 | 0 |
| foo | cvlan | 3 | clara | svlan | 200 | 0 |
| santa | svlan | 1 | | | | 1 |
| clara | svlan | 1 | | | | 1 |

As described above customer-side and provider-side ESIs may be created. A hierarchical relationship may be created between the customer-side and provider-side ESIs and the hierarchical relationship used to provision the network. A customer-side ESI typically acts as a "container" or a context that can hold up to 4K VLANs and their associated ports. A customer-side ESI can take service attributes, but usually does not take children or clients (unless they just specify abstract service parameters). A provider-side ESI typically specifies a context for one SVLAN encapsulation when there are customer-side ESIs associated with its child ESIs, and can take provider service parameters. A provider-side ESI can have one or more child ESIs, each child ESI carrying up to 4K VLANs.

Translation Using Flood Domain Configuration

Figure 9:
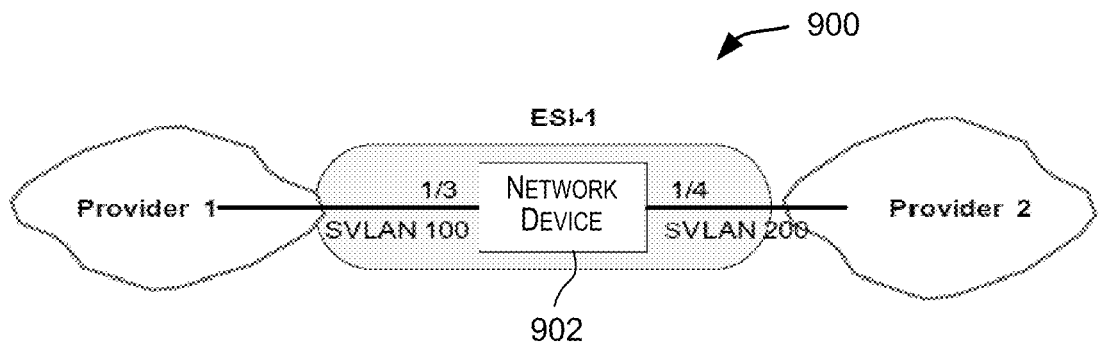
FIG. 9 depicts a network in which ESIs may be used for VLAN translation at an inter-provider boundary according to an embodiment of the present invention.

ESIs may be used to facilitate SVLAN translation at an inter-provider boundary. For example, ESIs may be used to perform provisioning in the network setup 900 depicted in FIG. 9. As shown in FIG. 9, network device 902 provides an inter-provider boundary between Provider_1 network and Provider_2 network. In the embodiment depicted in FIG. 9, packets received by network device 902 on port 1/3 with SVLAN=100 are translated to port 1/4 with SVLAN=200 as the ports are in the same flood domain. ESIs may be configured to represent this as follows:
(config)# esi ESI_1 encapsulation svlan—Create an ESI "ESI_1" with SVLAN encapsulation
(config-esi-ESI_1)# single-flood-domain—Command used for SVLAN translation across provider domains
(config-esi-ESI_1)# vlan 100—Add VLAN to ESI "ESI 1"
(config-esi-ESI_1)# tagged ethernet 1/3—Associated port information
(config-esi-ESI_1)# vlan 200—Add second VLAN to ESI "ESI 1"
(config-esi-ESI_1)# tagged ethernet 1/4—Associated port information
(config-esi-ESI_1)# exit Provisioning of Provider Backbone Bridging (PBB) Networks The IEEE 802.1ah Provider Backbone Bridges (PBB) standard was developed to address the limitations of Provider Bridges (PB) and to add additional capabilities sought by Service Providers. PBB has the potential to simplify operations, e.g., by separating the customer and Service Provider addressing spaces, and to lower capital expenditures by reducing the cost of Ethernet switches used in the core of the network, since memory and processing power requirements are reduced by limiting MAC address learning to backbone MAC addresses.

Figure 10:
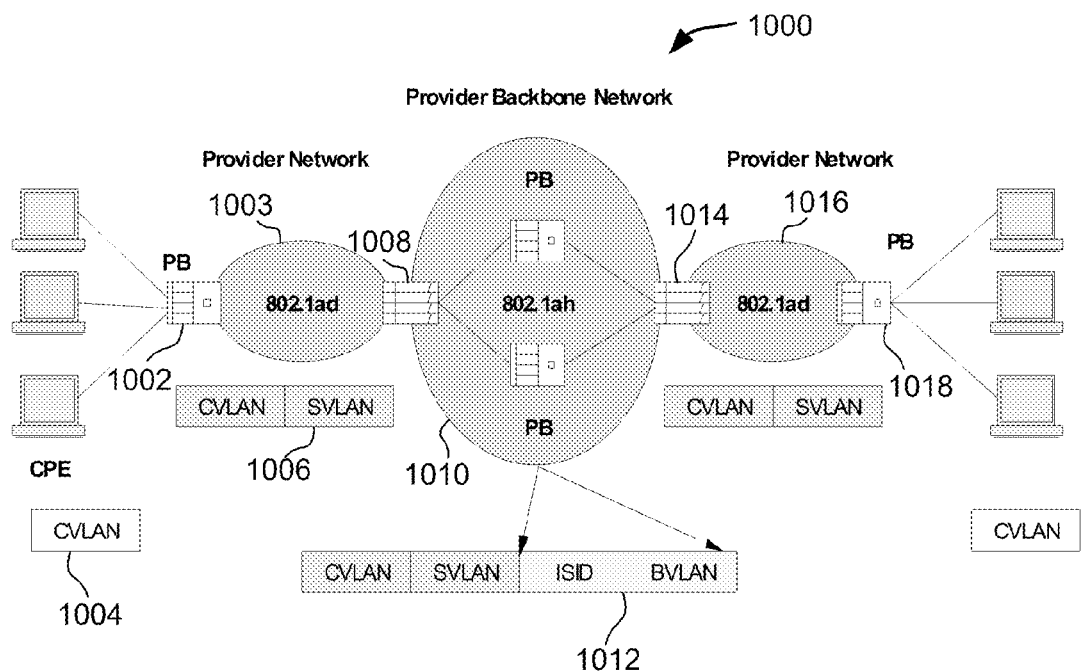
FIG. 10 shows an example of a PBB network and its components that may be provisioned using ESIs according to an embodiment of the present invention.

FIG. 10 depicts an example of a PBB network 1000 and its components that may be provisioned using ESIs according to an embodiment of the present invention. As depicted in FIG. 10, network device 1002 is located at a boundary between a customer network and an 802.1ad provider network 1003. In the left-to-right direction of traffic flow, network device 1002 receives packets from the customer network and forwards the packets to 802.1ad network 1003. The packets received by network device 1002 may have a CVLAN tag 1004. ESIs and hierarchical relationships between ESIs may be configured for network device 1002 such that network device 1002 adds an SVLAN tag 1006 to the packet prior to forwarding the packet on the provider network 1003.

In FIG. 10, network device 1008 is located at a boundary between 802.1d provider network 1003 and an 802.1ah provider network 1010. In the left-to-right direction of traffic flow in FIG. 10, network device 1008 receives packets from 802.1ad network 1003 and forwards the packets to 802.1ah network 1010. The packets received by network device 1008 may have a CVLAN-SVLAN tag. ESIs and hierarchical relationships between ESIs may be configured for network device 1008 such that network device 1008 adds an ISID-BVLAN tag 1012 to the packet prior to forwarding the packet on 802.1ah network 1010.

In FIG. 10, network device 1014 is located at a boundary between 802.1ah network 1010 and an 802.1ad provider network 1016. In the left-to-right direction of traffic flow in FIG. 10, network device 1014 receives packets from 802.1ah network 1010 and forwards the packets to 802.1ad network 1016. ESIs and hierarchical relationships between ESIs may be configured for network device 1014 such that network device 1014 removes an ISID-BVLAN tag 1012 from the packet prior to forwarding the packet on 802.1ad network 1016.

In FIG. 10, network device 1018 is located at a boundary between 802.1ad network 1016 and a customer network. In the left-to-right direction of traffic flow in FIG. 10, network device 1018 receives packets from 802.1ad network 1016 and forwards the packets to the customer network. ESIs and hierarchical relationships between ESIs may be configured for network device 1018 such that network device 1018 removes an SVLAN tag from the packet prior to forwarding the packet to the customer network.

Figure 11:
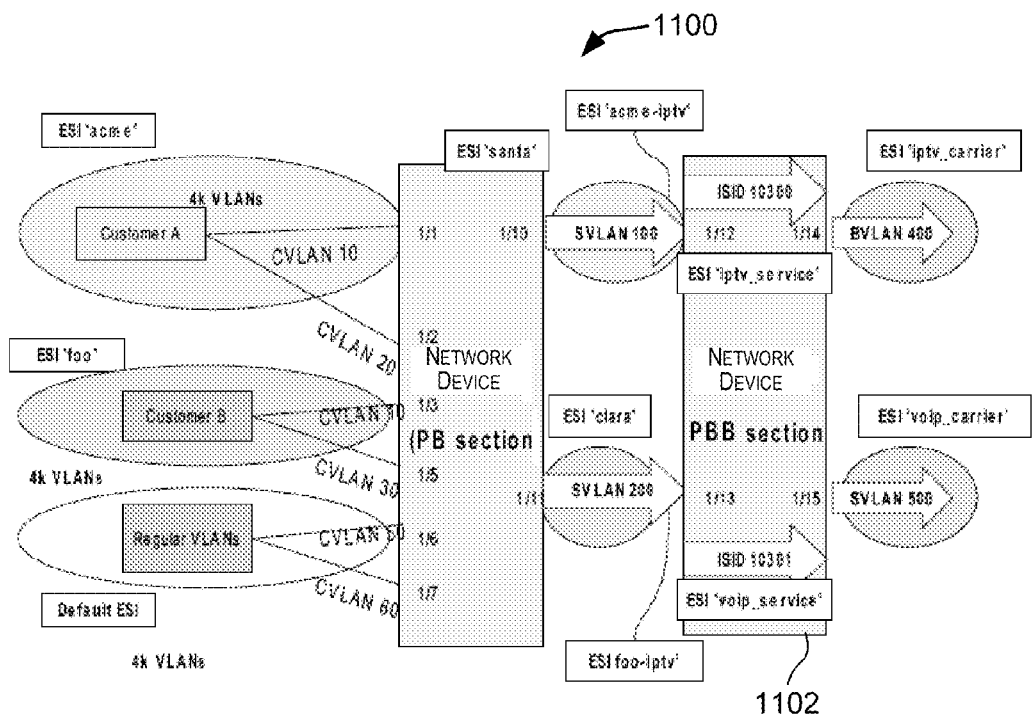
FIG. 11 depicts a simplified high-level Provider Backbone Bridging (PBB) network configuration in which ESIs may be used to provision the network according to an embodiment of the present invention.

FIG. 11 depicts a simplified high-level Provider Backbone Bridging (PBB) network configuration 1100 in which ESIs may be used to provision the network according to an embodiment of the present invention. As depicted in FIG. 11, a network device 1102 takes in SVLAN inputs, maps them internally to an ISID, and then binds them to a BVLAN to provide PBB functionality. The PB output with SVLAN encapsulation using ESI "santa" is used to provide input to Ethernet port 1/12 which is configured as a backbone-edge port. An ESI "acme-iptv" is created for the incoming SVLAN (at VLAN ID=100). This is assigned to a BVLAN (VLAN ID=400) under ESI "iptv_carrier" by first mapping it to ISID 10300 under ESI "iptv_service". In this example, PB output with SVLAN encapsulation using ESI "clara" is used to provide input to Ethernet port 1/13 which is configured as a backbone-edge port. An ESI "foo-iptv' is created for the incoming SVLAN (at VLAN ID=200). This is assigned to an SVLAN (VLAN ID=500) under ESI "voip_carrier" by first mapping it to ISID 10301 under ESI "voip_service".

Figure 12:
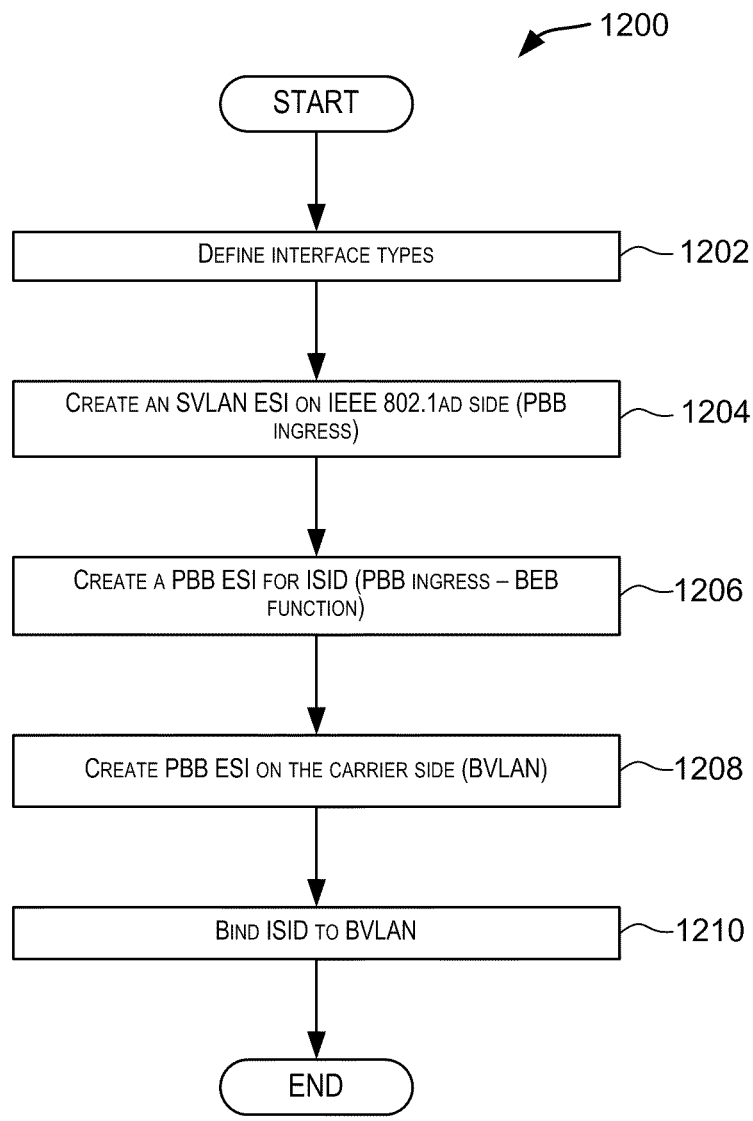
FIG. 12 is a simplified flowchart depicting a method for using ESIs to provision a PBB network according to an embodiment of the present invention.

FIG. 12 is a simplified flowchart 1200 depicting a method for using ESIs to provision a PBB network according to an embodiment of the present invention. The method depicted in FIG. 12 may be performed by hardware, software (e.g., code, program, instructions executed by a processor), or combinations thereof. The software may be stored on a computer-readable storage medium. In one embodiment, the method in FIG. 12 may be performed by a network device such as network device depicted in FIG. 10 or 11.

As depicted in FIG. 12, interface types are set up (step 1202) such that they match the encapsulation type of the VLAN expected on the interface. By default, interfaces are of type "customer-edge" so there is no need to define an interface type for CVLAN ESIs. For example, for the network configuration depicted in FIG. 11, interfaces 1/12 and 1/13 are set to "backbone-edge" (SVLAN). In one embodiment, this may be done using the following CLIs:
(config)#interface ethernet 1/12
(config-if-e10000-1/10)#port-type backbone-edge
(config-if-e10000-1/10)#exit The port 1/14 may be configured to be of "backbone-network" type:
(config)#interface ethernet 1/14
(config-if-e10000-1/10)#port-type backbone-network
(config-if-e10000-1/10)#exit An ESI for an SVLAN on IEEE 802.1ad side (PBB ingress) is then created (step 1204). For example, for the network depicted in FIG. 11, an ESI "acme-iptv" is created, as follows:
(config)# esi acme-iptv encapsulation svlan As part of 1204, SVLAN 100 is then added as a member of ESI "acme-iptv".
(config-esi-acme-iptv)# vlan 100

As part of 1204, physical ports are tagged to the VLAN. For example, port 1/12 ESI tagged to SVLAN 100.
(config-esi-acme-iptv-vlan-100)# tagged ethernet 1/12
(config-esi-acme-iptv-vlan-100)# exit An ESI is then created for PBB ISID (PBB ingress—BEB function) (step 1206). For example, for the network depicted in FIG. 11, an ESI "iptv-service" is created.
(config)# esi iptv-service encapsulation isid
ISID special attributes may be defined for ESI "iptv-service".
(config-esi-iptv-service)# isid 10300—Sets the ISID.
(config-esi-iptv-service-isid-10300)# exit An ESI is then created for PBB on the Carrier Side (BVLAN) (step 1208). For example, for the network depicted in FIG. 11 an ESI "iptv-carrier" for the carrier service providing IEEE 802.1ah.
(config)# esi iptv-carrier encapsulation bvlan
Members and attributes of the newly created ESI may be defined. For example, VLANs may be added to the ESI.
(config-esi-iptv-carrier)# vlan 400
Port configuration information may be added.
(config-esi-iptv-carrier-vlan-400)# tagged ethernet 1/14

The ESI for ISID is then bound to or associated with the ESI for BVLAN (step 1210). For example, for the network depicted in FIG. 11, it is specified that ISID ESI "iptv-service" is a child of BVLAN ESI "iptv-carrier". In one embodiment, the binding is done in two steps. Because of the port type difference, different ESIs are used for binding SVLANs at the boundary of the PB and PBB systems. On the PBB side, the first command below binds SVLAN ESI "acme-iptv" to ISID ESI "iptv-service" then puts the ISID inside BVLAN. Similarly, the second command binds SVLAN ESI "foo-iptv" to ISID ESI "voip service" then puts the ISID "voip-service" inside BVLAN.

1. Bind SVLAN ESI "acme-iptv" to ISID ESI "iptv-service" then put the ISID inside BVLAN.
(config)# esi acme-iptv encapsulation svlan
(config-esi-acme-iptv)# vlan 100
(config-esi-acme-iptv-vlan-100)# tagged ethernet 1/12
(2). Create PBB ESI for ISID (PBB ingress—BEB function)
(config)# esi iptv-service encapsulation isid
(config-esi-iptv-service)# isid 10300
(config-esi-iptv-service-isid-10300)# exit
(3). Create PBB ESI on the Carrier Side (BVLAN)
(config)# esi iptv-carrier encapsulation bvlan
(config-esi-iptv-carrier)# vlan 400
(config-esi-iptv-carrier-vlan-400)# tagged ethernet 1/14
(4). Bind ISID to BVLAN
(config)# esi-client iptv-service After the above processing, the ESI configurations are as shown in Table B.

TABLE B

| ESI Name | Encap | # Members | Provider ESI | Provider Encap | Provider VLAN | Client ESIs |
|---|---|---|---|---|---|---|
| acme | cvlan | 2 | santa | svlan | 100 | 0 |
| foo | cvlan | 2 | clara | svlan | 200 | 0 |
| santa | svlan | 1 | iptv-service | isid | 10300 | 1 |
| clara | svlan | 1 | voip_service | isid | 10301 | 1 |
| iptv-service | isid | 1 | iptv-carrier | bvlan | 400 | 2 |
| iptv-carrier | bvlan | 1 | none | none | none | 1 |

As described above, ESIs may be used for various applications. ESIs may be used for aggregation of services (service hierarchy), different switching domains, (e.g., VLAN translation), service mapping (e.g., flooding domain), enables a virtual switch to be configured (e.g., multiple virtual switches can be configured within a physical switch, with each virtual switch acting as an independent switch), hierarchy of service bindings (different levels), virtual routing and switching (VRS) at the L2 domain, VLAN translation (e.g., many-to-many VLAN translation (N-way VLAN translation)), creation of single flood domain for different VLANs, end-to-end provisioning through the provider cloud, and other uses. The ESIs thus provide a provisioning environment that may be used for various types of network provisioning applications.

The use of ESIs decreases the network management burden on a network operator. Using ESIs enables a network operator to define network operations by using his/her network operation service goals to define individual service elements at each network point and defining rules for interconnecting them. This helps to ensure that the network service objectives are met at each location.

Further, ESIs enable ports to be hidden within a service, which enables an operator to overcome the huge challenge of managing network changes. ESIs enable port associations to become a part of the ESI and the ports are tied to network parameters inside the ESI, rather than becoming independent entities on their own for configuration. Using ESIs, if there is a change in a port attribute, the operator only has to change the affected port attribute inside an individual ESI. This is substantially different from techniques wherein the operator would have had to do a reconfiguration of the network. Further, using ESIs, when a port is added for a particular service, the operator can set rules for matching against limitations of the service type, so there is no misconfiguration or a network disruption caused by associating an incorrect port type.

Allowing parent-child relationships to be established between ESIs enables a hierarchy of ESIs to be created. This helps in establishing network packet encapsulations/decapsulations at each stage of a multistage network so an operation at a port is compatible with the next port. By using ESIs, bandwidth and Quality of Service (QoS) parameters are properly configured and checked against capabilities at each node automatically by defining a network-wide rule, rather than having to manually verify configuration at each stage. This enables an operation at a port to be compatible with the next port. A hierarchy of ESIs connected by rules of interconnection provides a complete view of the network and help a network operator design the network without manually interconnecting every port pair.

In one embodiment, ESIs may be used for configuring network parameters such as encapsulations, port bindings, bandwidth allocations, and any other network properties. ESI names enable clear identification of a set of network resources. The ESI framework enables binding ESIs in parent-child relationships to define successive network encapsulations, bandwidth allocations, and any other service parameters for defining multistage network operation. The ESI framework enables a network operator to define network operation by using his/her network operation service goals to define individual service elements at each network point and defining rules for interconnecting them. This helps to make sure the network service objectives are met at each location. Using the ESI framework, bandwidth and quality of service (QoS) parameters may be properly configured and checked against capabilities at each node automatically by defining a network-wide rule, rather than having to manually verify configuration at each stage.

Figure 13:
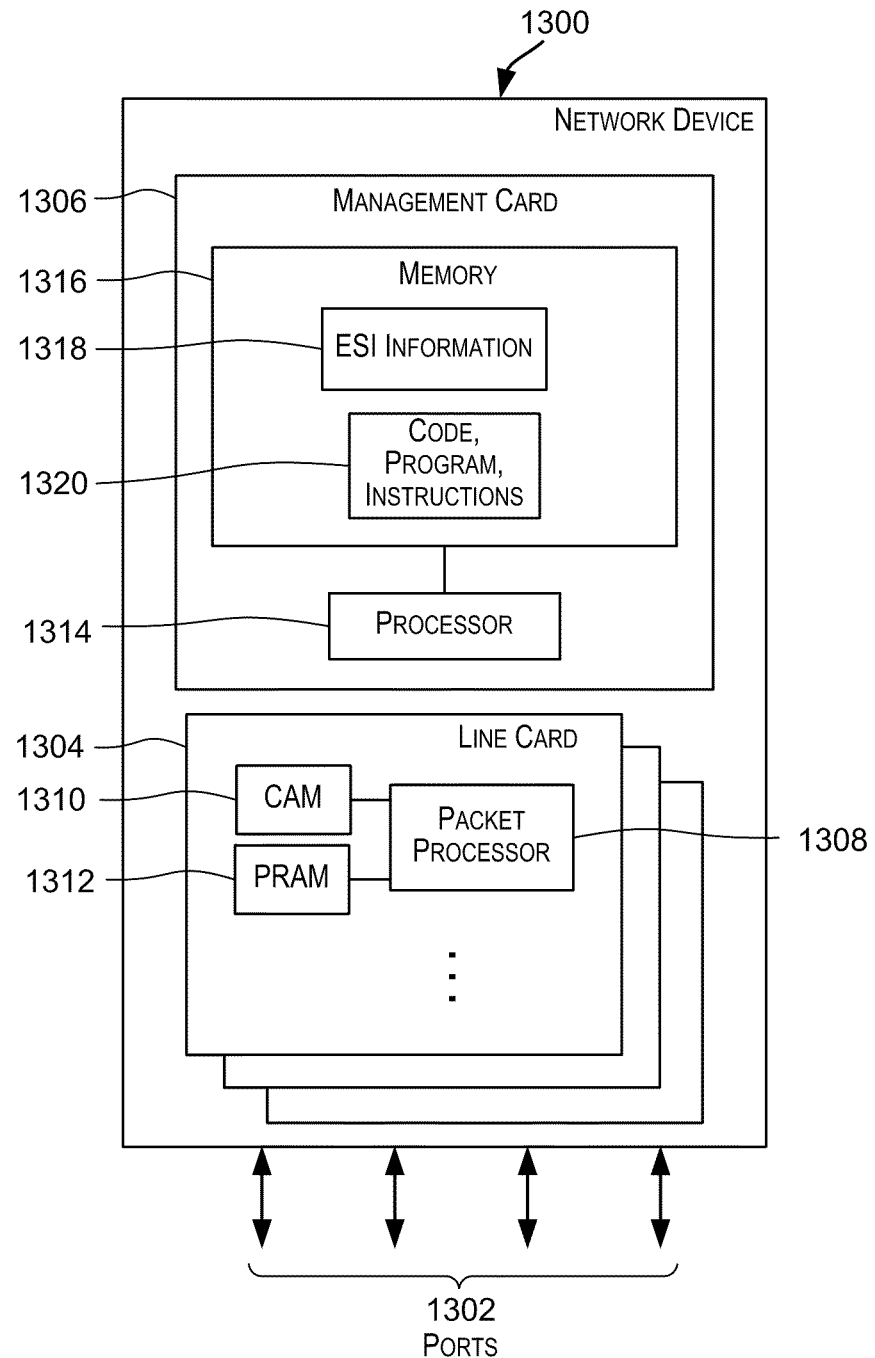
FIG. 13 depicts a simplified block diagram of a network device that may incorporate an embodiment of the present invention.

FIG. 13 depicts a simplified block diagram of a network device 1300 that may be configured to facilitate creation and use of ESIs according to an embodiment of the present invention. Network device 1300 may be a router or switch that is configured to forward data such as routers and switches provided by Brocade Communications Systems, Inc. In the embodiment depicted in FIG. 13, network device 1300 comprises a plurality of ports 1302 for receiving and forwarding data packets and multiple cards that are configured to perform processing to facilitate forwarding of the data packets. The multiple cards may include one or more line cards 1304 and one or more management cards 1306. A card, sometimes also referred to as a blade or module, can be inserted into one of a plurality of slots on the chassis of network device 1300. This modular design allows for flexible configurations with different combinations of cards in the various slots of the device according to differing network topologies and switching requirements. The components of network device 1300 depicted in FIG. 13 are meant for illustrative purposes only and are not intended to limit the scope of the invention in any manner. Alternative embodiments may have more or less components than those shown in FIG. 13.

Ports 1302 represent the I/O plane for network device 1300. Network device 1300 is configured to receive and forward data using ports 1302. A port within ports 1302 may be classified as an input port or an output port depending upon whether a data packet is received or transmitted using the port. A port over which a data packet is received by network device 1300 is referred to as an input port. A port used for communicating or forwarding a data packet from network device 1300 is referred to as an output port. A particular port may function both as an input port and an output port. A port may be connected by a link or interface to a neighboring network device or network. Ports 1302 may be capable of receiving and/or transmitting different types of data traffic at different speeds including 1 Gigabit/sec, 10 Gigabits/sec, or more. In some embodiments, multiple ports of network device 1300 may be logically grouped into one or more trunks.

Upon receiving a data packet via an input port, network device 1300 is configured to determine an output port for the packet for transmitting the data packet from the network device to another neighboring network device or network. Within network device 1300, the packet is forwarded from the input network device to the determined output port and transmitted from network device 1300 using the output port. In one embodiment, forwarding of packets from an input port to an output port is performed by one or more line cards 1304. Line cards 1304 represent the data forwarding plane of network device 1300. Each line card 1304 may comprise one or more packet processors 1308 that are programmed to perform forwarding of data packets from an input port to an output port. A packet processor on a line card may also be referred to as a line processor. Each packet processor 1308 may have associated memories to facilitate the packet forwarding process. In one embodiment, as depicted in FIG. 13, each packet processor 1308 may have an associated content addressable memory (CAM) 1310 and a RAM 1312 for storing forwarding parameters (RAM 1312 may accordingly also be referred to as a parameter RAM or PRAM). In one embodiment, for a packet received via an input port, the packet is provided to a packet processor 1308 of a line card 1304 coupled to the input port. The packet processor receiving the packet is configured to determine an output port of network device 1300 to which the packet is to be forwarded based upon information extracted from the packet. The extracted information may include, for example, the header of the received packet. In one embodiment, a packet processor 1308 is configured to perform a lookup in its associated CAM 1310 using the extracted information. A matching CAM entry then provides a pointer to a location in the associated PRAM 1312 that stores information identifying how the packet is to be forwarded within network device 1300. Packet processor 1308 then facilitates forwarding of the packet from the input port to the determined output port.

Since processing performed by a packet processor 1308 needs to be performed at a high packet rate in a deterministic manner, packet processor 1308 is generally a dedicated hardware device configured to perform the processing. In one embodiment, packet processor 1308 is a programmable logic device such as a field programmable gate array (FPGA). Packet processor 1308 may also be an ASIC.

Management card 1306 is configured to perform management and control functions for network device 1300 and thus represents the management plane for network device 1300. In one embodiment, management card 1306 is communicatively coupled to line cards 1304 and includes software and hardware for controlling various operations performed by the line cards. In one embodiment, a single management card 1306 may be used for all of line cards 1304 in network device 1300. In alternative embodiments, more than one management card may be used, with each management card controlling one or more line cards.

A management card 1306 may comprise a processor 1314 (also referred to as a management processor) that is configured to perform functions performed by management card 1306 and associated memory 1306. As depicted in FIG. 13, ESI information 1318 may be stored in memory 1316. Memory 1316 may also store various programs/code/instructions 1320 and data constructs that are used for processing performed by processor 1314 of management card 1306. For example, programs/code/instructions 1320 may include programs/code/instructions, which when executed by processor 1314, facilitate creation and use of ESIs. In one embodiment, processor 1314 is a general purpose microprocessor such as a PowerPC, Intel, AMD, or ARM microprocessor, operating under the control of software 1320 stored in associated memory 1316.

In another embodiment, line card 1304 may also comprise a processor and associated memory like processor 1314 and associated memory 1316 of management card 1306.

As described above, command line interfaces (CLIs) may be used to create and manage ESIs and to provision a network using ESIs. Additionally, other utilities may also be provided for creating, managing, and using ESIs to perform network provisioning. For example, network management software utilities such as the IronView Network Manager (INM) provided by Brocade Communications Systems, Inc. may be used to configure and manage ESIs, ESI hierarchies, and ESI members (such as VLAN, port, and other L2/L3 parameters) through Simple Network Management Protocol (SNMP) MIB (Management Information Base) or other network management objects. The network management utility may be executed by client or provider devices or other devices configured for managing/monitoring a network.

In one embodiment, the network management utility may provide a unified interface for the monitoring and management of a network environment comprising client and provider networks. Tools provided by the network management utility may be used by network administrators for configuring, managing, monitoring, and provisioning networks using ESIs. For example, an interactive graphical user interface (GUI) may be provided for performing tasks such as creation of ESIs, creating hierarchies using ESIs, provisioning networks using the ESIs and other ESI-related tasks. A network management utility may be Web-based and enable a network administrator to access network elements from any client, anywhere in the network.

The SNMP protocol may also be used to configure ESIs and use the ESIs to provision a network.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A system comprising:
   a plurality of ports configurable to receive and forward data; and
   a processor configurable to:
      enable creation of a first service instance, the first service instance comprising a set of one or more elements and a set of one or more attributes and associated values;
      enable creation of a second service instance, the second service instance comprising a set of one or more elements;
      enable a hierarchical relationship to be created between the first service instance and the second service instance, the hierarchical relationship causing the second service instance to inherit the set of attributes of the first service instance and the associated values; and
      cause a packet to be modified based upon the hierarchical relationship between the first service instance and the second service instance.

2. The system of claim 1 wherein the processor is configurable to modify the hierarchical relationship by making the second service instance an element of the first service instance in response to one or more commands inputted through a command line interface of the system.

3. The system of claim 1 wherein the processor is configurable to modify the packet by adding a tag to the packet or removing a tag from the packet based upon the hierarchical relationship between the first service instance and the second service instance.

4. The system of claim 1 wherein:
   the set of one or more attributes of the first service instance comprises a first attribute associated with a first value; and
   the first attribute is assigned a second value in the second service instance, the second value being different from the first value and overriding the first value inherited from the first service instance; and
   the second service instance inherits the set of attributes of the first service instance and the associated values in response to a determination that the second service instance hierarchically descends from the first service instance.

5. The system of claim 1 wherein:
   the set of elements of the first service instance comprise a first set of one or more L2/L3 parameters; and
   the set of elements of the second service instance comprise a second set of one or more L2/L3 parameters.

6. The system of claim 1 wherein the first service instance supports at least 4096 VLANs and the second service instance supports at least another 4096 VLANs.

7. The system of claim 1 wherein the first service instance and the second service instance enable the system to support more than 4096 VLANs.

8. The system of claim 1 wherein:
   the set of elements of the first service instance comprises a first VLAN and its associated port; and
   the set of attributes of the first service instance comprises an attribute indicating a type of the first VLAN;
   the set of elements of the second service instance comprises a second VLAN and its associated port; and
   a third service instance maps an identifier of the second VLAN to a port, of the plurality of ports, different from that to which the second service instance maps the identifier of the second VLAN.

9. The system of claim 8 wherein the type indicated by the attribute of the first service instance is one of a customer VLAN (CVLAN), a service VLAN (SVLAN), a B-component VLAN (B-VLAN), or an I-component service ID (ISID).

10. The system of claim 8 wherein the first VLAN is for a provider network and the second VLAN is for a customer network.

11. The system of claim 8 wherein the first VLAN is for a first provider network and the second VLAN is for a second provider network.

12. The system of claim 1 wherein the first service instance comprises:
   a field for identifying a service instance that has the first service instance as its member element.

13. The system of claim 1 wherein the processor is configurable to provision an IEEE 802.1ah Provider Backbone Bridging (PBB) network using the first service instance and the second service instance.

14. The system of claim 1 wherein the processor is configurable to provision an IEEE 802.1ad Provider Bridging (PB) network using the first service instance and the second service instance.

15. The system of claim 1 wherein the set of one or more attributes of the first service instance comprises at least one of an attribute for specifying quality of service (QoS) or an attribute for specifying bandwidth allocation; and wherein the second service instance inherits, from the first service instance, a value of said QoS or said bandwidth allocation.

16. A computer-readable storage memory storing a plurality of instructions for controlling a processor, the plurality of instructions comprising:
   instructions that cause the processor to enable creation of a first service instance for a network device, the first service instance comprising a set of one or more elements and a set of one or more attributes and associated values, the set of elements comprising one or more L2/L3 parameters;
   instructions that cause the processor to enable creation of a second service instance for the network device, the second service instance comprising a set of one or more elements;
   instructions that cause the processor to enable a hierarchical relationship to be created between the first service instance and the second service instance, the hierarchical relationship causing the second service instance to inherit the set of attributes of the first service instance; and
   instructions that cause the processor to, for a packet processed by the network device, cause the packet to be modified based upon the hierarchical relationship between the first service instance and the second service instance.

17. The computer-readable storage memory of claim 16 wherein the instructions that cause the processor to enable the hierarchical relationship to be created between the first service instance and the second service instance comprise instructions that cause the processor to make the second service instance an element of the first service instance in response to one or more commands inputted through a command line interface.

18. The computer-readable storage memory of claim 16 wherein the instructions that cause the processor to cause a modification to be made to the packet comprise instructions that cause the processor to add a tag to the packet or remove a tag from the packet based upon the hierarchical relationship between the first service instance and the second service instance.

19. The computer-readable storage memory of claim 16 wherein:
the set of one or more attributes of the first service instance comprises a first attribute associated with a first value; and
the first attribute is assigned a second value in the second service instance, the second value being different from the first value and overriding the first value inherited from the first service instance; and
the second service instance inherits the set of attributes of the first service instance in response to a determination that the second service instance hierarchically descends from the first service instance.

20. The computer-readable storage memory of claim 16 wherein:
the set of elements of the first service instance comprise a first set of one or more L2/L3 parameters; and
the set of elements of the second service instance comprise a second set of one or more L2/L3 parameters.

21. The computer-readable storage memory of claim 16 wherein the first service instance supports at least 4096 VLANs and the second service instance supports at least another 4096 VLANs.

22. The computer-readable storage memory of claim 16 wherein the first service instance and the second service instance enable the network device to support more than 4096 VLANs.

23. The computer-readable storage memory of claim 16 wherein:
the set of elements of the first service instance comprises a first VLAN and its associated port; and
the set of attributes of the first service instance comprises an attribute indicating a type of the first VLAN;
the set of elements of the second service instance comprises a second VLAN and its associated port; and
a third service instance maps an identifier of the second VLAN to a port, of the plurality of ports, different from that to which the second service instance maps the identifier of the second VLAN.

24. The computer-readable storage memory of claim 23 wherein the type indicated by the attribute of the first service instance is one of a customer VLAN (CVLAN), a service VLAN (SVLAN), a B-component VLAN (B-VLAN), or an I-component service ID (ISID).

25. A method comprising:
enabling, by a network device, creation of a first service instance for the network device, the first service instance comprising a set of one or more elements and a set of one or more attributes and associated values, the set of elements comprising one or more L2/L3 parameters;
enabling, by the network device, creation of a second service instance for the network device, the second service instance comprising a set of one or more elements;
causing, by the network device, a hierarchical relationship to be created between the first service instance and the second service instance, the hierarchical relationship causing the second service instance to inherit the set of attributes of the first service instance; and
modifying, by the network device, a packet based upon the hierarchical relationship between the first service instance and the second service instance.

26. The method of claim 25 wherein enabling the hierarchical relationship to be created between the first service instance and the second service instance comprises making the second service instance an element of the first service instance in response to one or more commands inputted through a command line interface.

27. The method of claim 25 wherein modifying the packet comprises adding a tag to the packet or removing a tag from the packet based upon the hierarchical relationship between the first service instance and the second service instance.

28. The method of claim 25 wherein:
the set of one or more attributes of the first service instance comprises a first attribute associated with a first value; and
the first attribute is assigned a second value in the second service instance, the second value being different from the first value and overriding the first value inherited from the first service instance; and
the second service instance inherits the set of attributes of the first service instance in response to a determination that the second service instance hierarchically descends from the first service instance.

29. The method of claim 25 wherein:
the set of elements of the first service instance comprise a first set of one or more L2/L3 parameters; and
the set of elements of the second service instance comprise a second set of one or more L2/L3 parameters.

30. The method of claim 25 wherein the first service instance supports at least 4096 VLANs and the second service instance supports at least another 4096 VLANs.

31. The method of claim 25 wherein the first service instance and the second service instance enable the network device to support more than 4096 VLANs.

32. The method of claim 25 wherein:
the set of elements of the first service instance comprises a first VLAN and its associated port; and
the set of attributes of the first service instance comprises an attribute indicating a type of the first VLAN;
the set of elements of the second service instance comprises a second VLAN and its associated port; and
a third service instance maps an identifier of the second VLAN to a port, of the plurality of ports, different from that to which the second service instance maps the identifier of the second VLAN.

33. The method of claim 32 wherein the type indicated by the attribute of the first service instance is one of a customer VLAN (CVLAN), a service VLAN (SVLAN), a B-component VLAN (B-VLAN), or an I-component service ID (ISID).

* * * * *